United States Patent
O'Brien

(10) Patent No.: US 11,521,290 B2
(45) Date of Patent: Dec. 6, 2022

(54) SYSTEMS AND METHODS FOR STORING CONTRACT INFORMATION ON MULTIPLE BLOCKCHAIN LEDGERS

(71) Applicant: Patrick Damien O'Brien, Chesire (GB)

(72) Inventor: Patrick Damien O'Brien, Chesire (GB)

(*) Notice: Subject to any disclaimer, the term of this patent is extended or adjusted under 35 U.S.C. 154(b) by 0 days.

(21) Appl. No.: 16/742,344

(22) Filed: Jan. 14, 2020

(65) Prior Publication Data
US 2020/0151842 A1 May 14, 2020

Related U.S. Application Data

(63) Continuation-in-part of application No. 16/225,324, filed on Dec. 19, 2018, now Pat. No. 10,535,111, (Continued)

(51) Int. Cl.
*G06Q 50/34* (2012.01)
*G06Q 40/04* (2012.01)
(Continued)

(52) U.S. Cl.
CPC ............ *G06Q 50/34* (2013.01); *G06Q 40/04* (2013.01); *G07F 17/326* (2013.01); (Continued)

(58) Field of Classification Search
USPC ........................................................ 705/309
See application file for complete search history.

(56) References Cited

U.S. PATENT DOCUMENTS

| | | | | |
|---|---|---|---|---|
| 5,895,450 A | * | 4/1999 | Sloo | G06Q 10/10 705/309 |
| 7,103,580 B1 | * | 9/2006 | Batachia | G06Q 20/40 705/1.1 |

(Continued)

FOREIGN PATENT DOCUMENTS

| | | |
|---|---|---|
| CN | 108256967 A | 7/2018 |
| CN | 110502931 A | 11/2019 |

(Continued)

OTHER PUBLICATIONS

Satoshi Nakamoto "Bitcoin: A Peer-to-Peer Electronic Cash System," www.bitcoin.org, Oct. 31, 2008.
(Continued)

*Primary Examiner* — Carrie S Gilkey
*Assistant Examiner* — Lance William White
(74) *Attorney, Agent, or Firm* — Allen F. Bennett; Bennett Intellectual Property

(57) ABSTRACT

A system and method for resolving contract disputes utilizes one or more computing devices to receive a dispute resolution request, invite other parties to submit a response to the dispute resolution request, and submit the dispute to a plurality of delegates based on the type of dispute and the qualifications of the delegates. The delegates provide dispute resolution decisions, and a consensus algorithm is applied to the decisions to arrive at a consensus contract outcome. A record of the consensus contract outcome, including the disputed contract and the nature of the dispute are recorded on a permissioned blockchain and also optionally recorded on an external blockchain distributed ledger.

15 Claims, 10 Drawing Sheets

Related U.S. Application Data which is a continuation of application No. 14/693,855, filed on Apr. 22, 2015, now Pat. No. 10,198,769, which is a continuation of application No. 14/257,985, filed on Apr. 21, 2014, now Pat. No. 9,033,798, which is a continuation of application No. 13/899,569, filed on May 22, 2013, now Pat. No. 8,727,869.

(60) Provisional application No. 62/636,763, filed on Feb. 28, 2018.

(51) Int. Cl.
  *G07F 17/32* (2006.01)
  *G07F 17/34* (2006.01)

(52) U.S. Cl.
  CPC ...... *G07F 17/3225* (2013.01); *G07F 17/3244* (2013.01); *G07F 17/3276* (2013.01); *G07F 17/3286* (2013.01); *G07F 17/34* (2013.01); *G07F 17/3288* (2013.01)

(56) References Cited

U.S. PATENT DOCUMENTS

| | | | | |
|---|---|---|---|---|
| 7,756,772 | B1* | 7/2010 | Konopnicki | G06Q 30/06 705/26.8 |
| 10,102,265 | B1* | 10/2018 | Madisetti | G06Q 20/06 |
| 10,346,428 | B2* | 7/2019 | Madhavan | G06F 16/273 |
| 10,447,478 | B2 | 10/2019 | Gray | |
| 10,505,720 | B2 | 12/2019 | Li | |
| 10,616,324 | B1* | 4/2020 | Kaddoura | H04L 43/04 |
| 2002/0069182 | A1* | 6/2002 | Dwyer | G06Q 10/10 705/80 |
| 2002/0133362 | A1* | 9/2002 | Karathanasis | G06Q 10/10 705/309 |
| 2004/0128155 | A1 | 7/2004 | Vaidyanathan et al. | |
| 2004/0133526 | A1* | 7/2004 | Shmueli | G06Q 30/06 705/80 |
| 2005/0278203 | A1* | 12/2005 | Monma | G06Q 10/087 705/14.53 |
| 2006/0085330 | A1* | 4/2006 | Imrey | G06Q 20/10 705/39 |
| 2008/0126266 | A1* | 5/2008 | Burchetta | G06Q 10/06 705/80 |
| 2008/0140683 | A1* | 6/2008 | Hanif | G06Q 30/06 |
| 2011/0047007 | A1* | 2/2011 | Rule | G06Q 10/107 705/7.39 |
| 2012/0016943 | A1* | 1/2012 | Greenberg | G06Q 10/06 709/206 |
| 2014/0164255 | A1* | 6/2014 | Daly | G06Q 50/188 705/80 |
| 2015/0379510 | A1* | 12/2015 | Smith | G06Q 20/3829 705/71 |
| 2016/0028552 | A1* | 1/2016 | Spanos | H04L 9/3297 713/178 |
| 2017/0046693 | A1* | 2/2017 | Haldenby | G06Q 20/367 |
| 2017/0289111 | A1* | 10/2017 | Voell | H04L 9/14 |
| 2017/0293669 | A1* | 10/2017 | Madhavan | G06Q 40/04 |
| 2018/0268382 | A1 | 2/2018 | Wasserman | |
| 2018/0060914 | A1 | 3/2018 | Conrad | |
| 2019/0013932 | A1* | 1/2019 | Maino | G06F 9/451 |
| 2019/0058581 | A1* | 2/2019 | Wood | H04L 9/0637 |
| 2019/0171848 | A1 | 6/2019 | Kalita et al. | |
| 2019/0199787 | A1* | 6/2019 | Carver | H04L 67/108 |
| 2019/0236594 | A1* | 8/2019 | Ehrlich-Quinn | G06Q 20/065 |
| 2019/0244306 | A1* | 8/2019 | Kursun | G06F 16/137 |
| 2019/0318346 | A1* | 10/2019 | Ben-David | G06Q 20/3829 |
| 2019/0318349 | A1 | 10/2019 | Palombo et al. | |
| 2019/0339668 | A1* | 11/2019 | Biernat | G05B 19/4093 |
| 2019/0349203 | A1 | 11/2019 | Scherrer et al. | |
| 2019/0378128 | A1 | 12/2019 | Moore et al. | |
| 2019/0385256 | A1 | 12/2019 | Nahamoo et al. | |
| 2019/0392536 | A1 | 12/2019 | Rice | |
| 2020/0007312 | A1* | 1/2020 | Vouk | H04L 67/104 |
| 2020/0042989 | A1* | 2/2020 | Ramadoss | G06Q 20/102 |
| 2020/0074461 | A1* | 3/2020 | DeRosa-Grund | G06Q 20/40145 |
| 2020/0162239 | A1* | 5/2020 | Carver | H04L 63/123 |

FOREIGN PATENT DOCUMENTS

| | | |
|---|---|---|
| EP | 3512159 A1 | 7/2019 |
| WO | 2019100112 A1 | 5/2019 |
| WO | 2019155268 A1 | 8/2019 |
| WO | 2019214756 A2 | 11/2019 |

OTHER PUBLICATIONS

Gareth Peters, Efstathios Panayi "Understanding Modern Banking Ledgers through Blockchain Technologies: Future of Transaction Processing and Smart Contracts on the Internet of Money," arXiv:1511.05740v1, Nov. 19, 2015.

\* cited by examiner

| Rating | Incorrect | Adjustment | Reward |
|--------|-----------|------------|--------|
| 100 | 0 | $2^0$ | 100 |
| 99 | 1 | $2^1$ | 98 |
| 98 | 2 | $2^2$ | 96 |
| 97 | 3 | $2^3$ | 92 |
| 96 | 4 | $2^4$ | 84 |
| 95 | 5 | $2^5$ | 68 |

FIG. 6A $$\sum_r - 2i = i^1, i^2, i^3, i^4, i^5$$

FIG. 6B

SYSTEMS AND METHODS FOR STORING CONTRACT INFORMATION ON MULTIPLE BLOCKCHAIN LEDGERS

CROSS-REFERENCE TO RELATED APPLICATIONS

This application is a continuation in part of U.S. patent application Ser. No. 16/225/324 filed Dec. 19, 2018, now U.S. Pat. No. 10,535,111 issued on Jan. 14, 2020, which claims priority to U.S. Provisional Application No. 62/636,763 filed Mar. 7, 2018 and is also a continuation of U.S. patent application Ser. No. 14/693,855, filed Apr. 22, 2015, now U.S. Pat. No. 10,198,769 issued on Feb. 5, 2019, which is a continuation of U.S. patent application Ser. No. 14/257,985, filed Apr. 21, 2014, now U.S. Pat. No. 9,033,798 issued on May 19, 2015, which is a continuation of U.S. patent application Ser. No. 13/899,569, filed May 22, 2013, now U.S. Pat. No. 8,727,869 issued on May 20, 2014, the entire contents of all of which are included herein by reference.

STATEMENT REGARDING FEDERALLY SPONSORED RESEARCH OR DEVELOPMENT

Not Applicable.

NAMES OF PARTIES TO A JOINT RESEARCH AGREEMENT

Not Applicable

REFERENCE TO SEQUENCE LISTING, A TABLE, OR A COMPUTER PROGRAM LISTING APPENDIX SUBMITTED ON A COMPACT DISC AND INCORPORATION-BY-REFERENCE OF THE MATERIAL

Not Applicable.

BACKGROUND OF THE INVENTION

Field of the Invention

The present invention relates to a systems and methods for storing data. More particularly, the invention relates to systems and methods for storing data for smart contracts and disputes over smart contracts using one or more distributed ledgers on one or more blockchain networks.

Description of the Related Art

Blockchain technology is relatively new technology. A blockchain is a data structure that stores a list of transactions and can be thought of as a distributed electronic ledger that records transactions between source identifiers and destination identifiers. Each transaction of the blockchain is bundled into blocks and every block (except for the first block) refers back to or is linked to a prior block in the chain.

They blockchain network is an internet database for a shared, distributed ledger stored on several nodes. Computer nodes maintain the blockchain and cryptographically validate each new block and thus the transactions contained in the corresponding block. This validation process includes solving a computationally difficult problem that is also easy to verify and is sometimes called a "proof-of-work." Blockchain is further explained in a 2008 article by Satoshi Nakamoto, titled "Bitcoin: A Peer-to-Peer Electronic Cash System" and a 2015 article by Gareth Peters and Estafios Panayi, titled "Understanding Modern Banking Ledgers through Blockchain Technologies: Future of Transaction Processing and Smart Contracts on the Internet of Money." The entire contents of both these articles are hereby incorporated by reference.

In addition to validation, a blockchain network also utilizes a validation consensus algorithm to identify the correctly "built" block to incorporate into the distributed ledger. This is done in order to overcome the "Byzantine General's" problem. One or more nodes, for a variety of reasons, may appear to be functioning properly but nonetheless construct a block incorrectly. This problem is inherent in any system which utilizes a variety of sources. Instead of trying to eliminate every possible fault that could lead to an incorrectly constructed plot, an algorithm identifies which of two or more versions of a block is the correct one that should be entered into the blockchain. There are many possible methods and algorithms for generating a consensus as to which version of a particular block is the correct one. One method is to simply select the most common version of the block generated by the nodes of the block chain. Because the majority of the blocks should be operating correctly, a consensus validation algorithm may be used to identify the most abundant version of the generated block and selected has the correct one. With very large block chain networks having a large number of nodes, a consensus validation algorithm is highly effective. As the number of nodes decreases, a consensus validation algorithm becomes less reliable.

While the transactions may be validated, the content or whether those transactions are valid is a major concern. The most celebrated aspect of Blockchain is that information is stored in an immutable ledger, distributed and trusted without the need for a central authority or intermediary party. While the focus on blockchain's value has traditionally been on its incorruptible, not enough attention is paid to the negative effects created when inputs to the trusted blockchain from any single source are untrustworthy. An example can be found in Bitcoin, where if a private key is stolen and a nefarious transaction is sent to the blockchain, the protocol will irreversibly report the transaction as valid, when in reality it was not. This is not an issue with the blockchain itself, rather, this is an issue with its data inputs. Said another way, while data integrity is enforced in the blockchain's distributed consensus protocol, there is still a significant obstacle in authenticating distributed trust and integrity of data inputs.

A Smart Contract is a computer protocol intended to digitally facilitate, verify, or enforce the negotiation or performance of a contract. Smart contracts are explained in the article by Peters. A smart contract is a computerized transaction protocol that executes the terms of a contract or agreement. The general objectives of smart contract design are to satisfy common contractual conditions (such as payment terms, liens, confidentiality, and even enforcement) and related economic goals include lowering fraud loss, arbitration and enforcement costs, and other transaction costs. As smart contracts expand their capabilities to enforce predetermined outcomes, the question arises of whether additional layers of distributed consensus to validate data is necessary before data is immutably mined into a blockchain.

As smart contracts and blockchain technology reshape the way customers and businesses interact, establishing trust in data is essential. This is especially true in emerging markets where existing processes are not trusted. For example, in less developed countries, legal systems and banking systems may be corrupt, and therefore less reliable for assistance in enforcing a contract. There also many jurisdictions in which it is uncertain whether a smart contract is enforceable. Additionally, as more legal contracts are codified into e-contracts there will be a need to verify conditions and/or performance to ensure terms are met before execution.

The above-described deficiencies of today's systems are merely intended to provide an overview of some of the problems of conventional systems, and are not intended to be exhaustive. Other problems with the state of the art and corresponding benefits of some of the various non-limiting embodiments may become further apparent upon review of the following detailed description.

As a result, there exists a need for improvements over the prior art and more particularly for a more efficient and better way for proving the trust worthiness of the blockchain and smart contracts. There is also a need to make the resolution of contractual disputes faster, less expensive and more efficient.

BRIEF SUMMARY OF THE INVENTION

Disclosed are methods and systems which provide mechanisms to verify data before it is committed to a blockchain ledger. The system includes a blockchain-based platform that facilitates immutability and distributed trust for smart contracts and data input. The platform validates the authenticity of data regarding a contractual outcome and/or performance by means of a bank of trusted and verified experts before it is put on the blockchain and used to execute smart contracts.

In one embodiment, methods and systems for recording smart contracts and disputed smart contract outcomes are disclosed. This Summary is provided to introduce a selection of disclosed concepts in a simplified form that are further described below in the Detailed Description including the drawings provided. This Summary is not intended to identify key features or essential features of the claimed subject matter. Nor is this Summary intended to be used to limit the claimed subject matter's scope.

In one embodiment, a method for storing data comprises receiving, by one or more computer devices, a dispute resolution request from a first contracting party, sending to a second contracting party the dispute resolution request and an invitation to provide a response to the dispute resolution request, receiving the response to the dispute resolution request from the second contracting party, a category to the dispute resolution request is assigned based on the dispute resolution request and the response to the dispute resolution request. A dispute case summary is generated based on the dispute reason code, the dispute resolution request and the response to the dispute resolution request. The dispute case summary is forwarded to three or more delegates within a dispute resolution network assigned to the category of the dispute resolution request. The dispute resolution decisions are received from the three or more delegates and a consensus dispute outcome is determined by applying a consensus algorithm to the dispute resolution decisions received from the three or more delegates of the dispute resolution network, based on a consensus algorithm. A dispute resolution record is stored on a permissioned blockchain network. The dispute resolution record includes the category of the dispute resolution request and the consensus dispute outcome and is forwarded to the first contracting party and the second contracting party.

The dispute resolution records may also include the dispute resolution decisions received by the delegates and an explanation of the dispute resolution outcome. The disputed contract can be a smart contract managed by the one or more computing devices. A notification may be sent to the first and second contracting parties of the occurrence of a triggering event of the smart contract and of a deadline within which to file a dispute resolution request. A transaction request may be forwarded to a cryptocurrency blockchain network based on the consensus dispute outcome. The transaction request may also include a hash based on the dispute resolution record and generated by a hash function of the permissioned blockchain. The one or more computing devices act as a node of a cryptocurrency blockchain network.

In another embodiment, the disputed contract is a smart contract managed by an external network and the dispute resolution request is sent to the one or more computing devices through the external network. A notification is sent to the first and second contracting parties upon the occurrence of a triggering event of the smart contract and of a deadline within which to file a dispute resolution request.

In another embodiment, a system for storing data, includes a processor and a non-transitory computer readable storage medium storing instructions executable by the processor to cause the system to perform operations comprising. A dispute resolution request is received from a first contracting party. The second contracting party is sent the dispute resolution request and invited to provide a response to the dispute resolution request. The response to the dispute resolution request is received from the second contracting party. A category is assigned to the dispute resolution request based on the dispute resolution request and the response to the dispute resolution request. A dispute case summary is created based on the dispute reason code, the dispute resolution request and the response to the dispute resolution request. The dispute case summary is sent to three or more delegates within a dispute resolution network assigned to the category of the dispute resolution request. Dispute resolution decisions from the three or more delegates are received and used to determine a consensus dispute outcome by applying a consensus algorithm to the dispute resolution decisions. A dispute resolution record is then stored on a permissioned blockchain network. The dispute resolution record is forwarded to the contracting parties.

It is therefore an object of the present invention to provide methods and systems of recording data related to smart contracts and smart contracts dispute resolution procedures using distributed ledgers on blockchain networks.

These and other objects and advantages of the present invention will become apparent from a reading of the attached specification and appended claims. There has thus been outlined, rather broadly, the more important features of the invention in order that the detailed description thereof that follows may be better understood, and in order that the present contribution to the art may be better appreciated. There are features of the invention that will be described hereinafter and which will form the subject matter of the claims appended hereto.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein:

FIG. 6A is a table showing a rating adjustment for the rating for each third-party for the apparatus, code, methods, and systems for confirming, modifying, causing to be performed and recording outcome related to contracts between a first user and a second user, according to an example embodiment;

FIG. 6B is a formula for calculating a third-party reward based upon third-party rating, for the apparatus, code, methods, and systems for confirming, modifying, causing to be performed and recording outcome related to contracts between a first user and a second user, according to an example embodiment;

DETAILED DESCRIPTION

Figure 1:
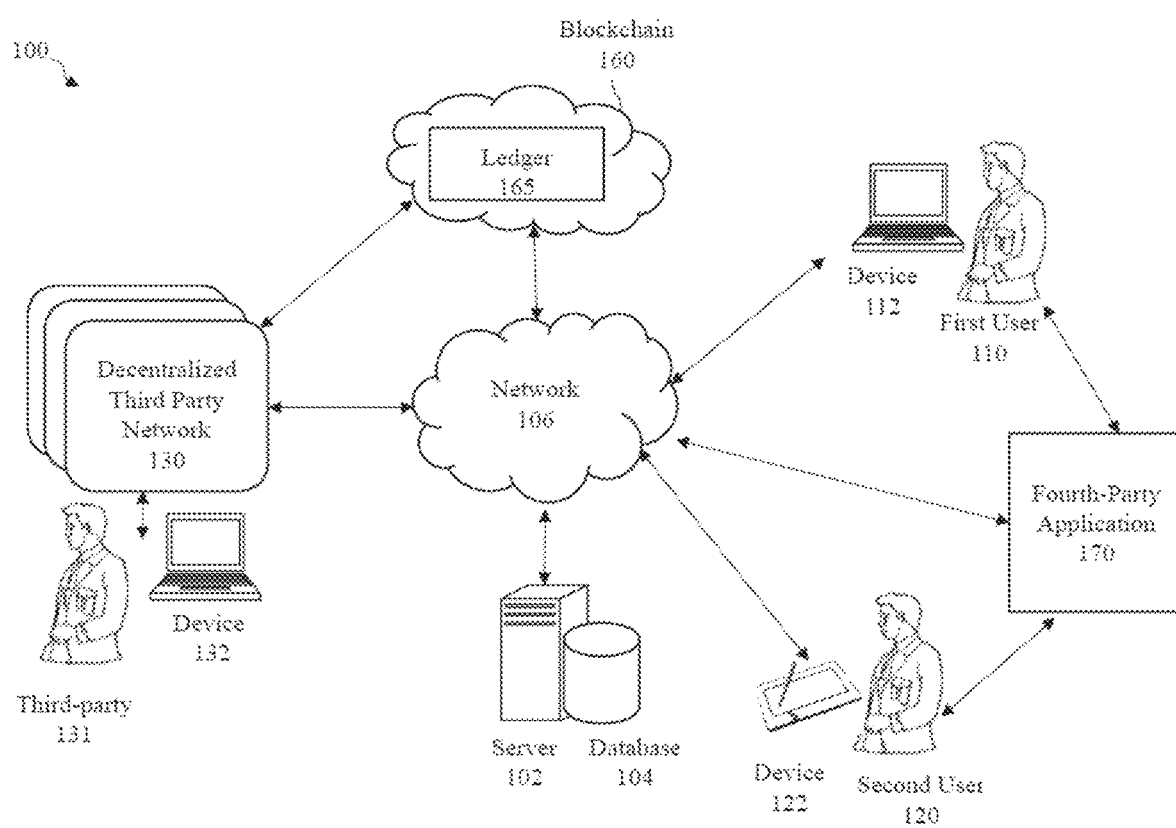
FIG. 1 is a diagram of an operating environment that supports apparatus, code, methods, and systems for confirming, modifying, causing to be performed and recording outcome related to contracts between a first user and a second user, according to an example embodiment.

The invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

The disclosed subject matter is described with reference to the drawings, wherein like reference numerals are used to refer to like elements throughout. In the following description, for purposes of explanation, numerous specific details are set forth in order to provide a thorough understanding of the various embodiments of the subject disclosure. It may be evident, however, that the disclosed subject matter may be practiced without these specific details. In other instances, well-known structures and devices are shown in block diagram form in order to facilitate describing the various embodiments herein. Various embodiments of the disclosure could also include permutations of the various elements recited in the claims as if each dependent claim was a multiple dependent claim incorporating the limitations of each of the preceding dependent claims as well as the independent claims. Such permutations are expressly within the scope of this disclosure.

Unless otherwise indicated, all numbers expressing quantities of ingredients, dimensions reaction conditions and so forth used in the specification and claims are to be understood as being modified in all instances by the term "about". The term "a" or "an" as used herein means "at least one" unless specified otherwise. In this specification and the claims, the use of the singular includes the plural unless specifically stated otherwise. In addition, use of "or" means "and/or" unless stated otherwise. Moreover, the use of the term "including", as well as other forms, such as "includes" and "included", is not limiting. Also, terms such as "element" or "component" encompass both elements and components comprising one unit and elements and components that comprise more than one unit unless specifically stated otherwise.

The disclosed embodiments improve upon the problems with the prior art by providing additional layers of distributed consensus to validate the inputs even before their outcomes are propagated and mined into a blockchain. The present invention provides safeguards and incentives to allow commerce in a decentralized environment for confirming, modifying, causing to be performed and recording outcome related to smart contracts. The present invention acts as a filter using algorithms of various individual inputs for confirming, modifying, causing to be performed and recording outcomes related to smart contracts. The present invention also provides an improvement over the prior art by also providing code, apparatus, methods and systems for rating and auditing the third-parties that confirm, modify, causing to be performed and recorded the outcome related to smart contracts. The present invention provides an additional layer, proof of trust (POT), or proof and trust (PAT) by providing a consensus to validate the inputs even before their outcomes are propagated and mined into a blockchain. The present invention may also be used for providing a consensus based upon a distributed analysis.

Additionally, the present inventions improve over the prior art by providing an incentive, benefit or reward to third-parties for accurate information related to disputed transactions. Additionally, the system improves of the prior art by assigning a rating and adjusting the third-party rating of each of the third-parties based upon if their decision information is accurate and adjusting the incentives, benefit or reward provided to each of the third-parties based upon the rating of each third-party. Additionally, the system improves of the prior art by also providing to the users and third-parties graphical user interfaces that provide informative experiences, which may include entertaining experiences so that the users and third-parties remain engaged with the graphical user interfaces. The system improves over the prior art by providing entertaining experiences related to disputes between positions of users.

Referring now to the Figures, in which like reference designators refer to like elements, there is shown in FIG. 1 an illustration of a block diagram showing the network architecture of a system 100 for confirming, modifying, causing to be performed and recording outcome related to contracts between a first user and a second user in accordance with one embodiment. A prominent element of FIG. 1 is the server or processor 102 associated with repository or database 104 and further coupled with network 106, which can be a circuit switched network, such as the Public Service Telephone Network (PSTN), or a packet switched network, such as the Internet or the World Wide Web, the global telephone network, a cellular network, a mobile communications network, or any combination of the above. Server 102 is a central controller or operator for functionality of the disclosed embodiments, namely, the sharing of electronic tickets between users.

The networked environment may also include a blockchain system 160 for storing one or more distributed ledgers 165 that records transactions. The transactions are bundled into blocks and every block (except for the first block) refers to or is linked to a prior block in the chain. Computer nodes may maintain the blockchain and cryptographically validate each new block and thus the transactions contained in the corresponding block.

A block chain or blockchain is a distributed database that maintains a list of data records on the ledger. The security of the block chain enhanced by the distributed nature of the block chain. A block chain typically includes several nodes. Each of the nodes may be one or more computers, databases, data stores, machines, operably connect to one another. In some cases, each of the nodes or multiple nodes are maintained by different entities. A block chain typically works without a central repository or single administrator. One well-known application of a block chain is the public ledger of transactions for cryptocurrencies such as used in bitcoin. The data records recorded in the block chain are enforced cryptographically and stored on the nodes of the block chain. A block chain provides numerous advantages over traditional databases. The nodes of a block chain may reach a consensus regarding the validity of a transaction contained on the transaction ledger. However, the verifying and allowing for disputes of the data related to the transaction is one aspect the present invention. Similarly, when multiple versions of a document or transaction exits on the ledger.

The block chain typically has two primary types of records. The first type is the transaction type, which consists of the actual data stored in the block chain relating to the transaction. The second type is the block type, which are records that confirm when and in what sequence certain transactions became recorded as part of the block chain. Transactions are created by participants using the block chain in its normal course of business, for example, when someone sends cryptocurrency to another person, and blocks are created by users known as "miners" who use specialized software/equipment to create blocks. Users of the block chain create transactions that are passed around to various nodes of the block chain. A "valid" transaction is one that can be validated based on a set of rules that are defined by the particular system implementing the block chain. Such a set of rules are referred to as a validation consensus algorithm. For example, in the case of cryptocurrencies, a valid transaction is one that is digitally signed, spent from a valid digital wallet and, in some cases, that meets other criteria. In some block chain systems, miners are incentivized to create blocks by a rewards structure that offers a pre-defined per-block reward and/or fees offered within the transactions validated themselves. Thus, when a miner successfully validates a transaction on the block chain, the miner may receive rewards and/or fees as an incentive to continue creating new blocks.

FIG. 1 includes mobile computing devices 112, 122, and 132 which may be smart phones, mobile phones, tablet computers, handheld computers, laptops, or the like. Mobile computing devices 112, 122, and 132 correspond to a first user 110, a second user 120 and third-party network 130 having numerous third-parties 131, wherein each third-party may use a remote computing device 132, respectively. Each of the computing devices include a user interface and/or graphical user interface.

FIG. 1 further shows that server 102 includes a database or repository 104, which may be a relational database comprising a Structured Query Language (SQL) database stored in a SQL server. Devices 112, 122, and 132 may also each include their own database. The repository 104 serves data from a database, which is a repository for data used by server 102 and devices 120, 122, 150 during operation of the disclosed embodiments. Database 104 may be distributed over one or more nodes or locations that are connected via network 106. FIG. 1 may also include a fourth-party application 170 represents an application is configured for receiving information related to the contracts between the first user and second user. The fourth-party application may also be configured for effectuating payments between the first and second users. In one embodiment, the fourth party application be configured for determining the contract outcome and associated contract outcome information for providing it to the system where the system may wait for the predetermined amount of time before recording into the block chain unless the disputed information is received. In other embodiments, the fourth party application transmits the contract the system where the system determines the contract outcome and associated contract outcome information. This fourth party application may itself be a blockchain system for documenting smart contracts and/or cryptocurrencies.

The database 104 may include a user record for each first user 110 or second user 120 and for each third-party 130. The system may be configured for creating a user record. A user record may include: A user record may include: contact/identifying information for the user (name, address, telephone number(s), email address, etc.), an IP address for a mobile computing device of the user, information pertaining to contracts associated with the user, contact/identifying information for friends of the user, electronic payment information for the user, information pertaining to the contracts made by the user, etc. A user record may also include a unique identifier for each user, a residential address for each user, the current location of each user (based on location-based services from the user's mobile computer) and a description of past contracts associated with each user. A user record may further include demographic data for each user, such as age, sex, income data, race, color, marital status, etc. In the present embodiment first user may enter into an agreement with a second user that includes a triggering event (further explained below).

The database 104 may also include a third-party record for each third-party 130. A third-party record may be created and may include contact/identifying information for the third-party (name, address, telephone number(s), email address, etc.), an IP address for a mobile computing device (s) of the user, information pertaining to contracts and third-party decision information (further explained below) associated with the user, consensus contract outcome information associated with the third-party, third-party reward information associated with each third-party. In in other embodiments, the third-party may be other computer systems configured for automatically receiving disputed information, performing a third-party analysis, determining the third-party outcome and transmitting the third-party decision information to the system for it to determine the consensus contract outcome information related to the consensus contract outcome. In one embodiment, each third-party may be an individual having access to a third-party remote computing device 132 having a user interface configured for receiving input. In other embodiment, the third-party may be an individual and may further include demographic data for each user, such as age, sex, income data, race, color, marital status, etc. Each third-party is defined is defined as an entity that receives disputed information (further explained below) related to a contract, performing an analysis (further explained below) of the disputed information, providing third-party decision information (further explained below) associated with the disputed information The database 104 may include a contract record for a contract entered between users. The contract may be a blockchain transaction. The system and code may be configured for creating a contract record based on information received. A contract record may include: a unique contract identifier, contact/identifying information for the user or users (unique identifier for the user, name, address, telephone number(s), email address, etc.) associated with the contract, an IP address for a mobile computing device of the user associated with the contract, consensus contract outcome information (further explained below), contract outcome information (further explained below), disputed information (further explained below), status information (further explained below), third-party decision information from a plurality of third-parties (further explained below), third-party reward information (further explained below), third-party rating information (further explained below).

In this embodiment, the contract is a Smart Contract associated with an agreement between a first user and a second user. As briefly explained above, Smart Contracts are computer processes that facilitate, verify and/or enforce negotiation and/or performance of a contract between parties. Smart contracts may include logic that emulates contractual clauses that are partially or fully self-executing and/or self-enforcing. One example of a Smart Contract is a digital rights management (DRM) contract used for protecting copyrighted works. Another example would be a wager on a horse race. The results of the race may be automatically received by the system managing the smart contract, which would then automatically transfer the amount of the wager based on the results of the horse race.

Optionally, the contract may be an agreement associated with subject matter between and or associated with the first user and second user. The contract may include a contract for services, contract for goods, a contract for land, a blockchain transaction, an insurance contract, a contract for non-performance, a wager or competition where each user has a competitive position or position regarding a real time event or an outcome of a real time event. In each of the contracts, both users will have a position associated with the contract. Each position may be mutually exclusive or may not be mutually exclusive. However, it is also understood that other agreements between parties may be included and are within the spirit and scope of present invention.

In operation, the subject matter associated with the contract may include data elements that provide logic and/or protocols to determine if the one or more actions or events occurred. In other words, the contract includes protocols associated with a triggering event intended to occur in the future.

The database 104 may be configured to store data include triggering event information. The triggering event information includes data elements related to a triggering event. The triggering event information may be received from an outside source. In other embodiments, the system may be configured to monitor data to determine if a triggering event has occurred and then create triggering event information. The triggering event may be related to the subject matter of the contract. For example, the triggering event may be related to a commodity or security, an insurance policy, a sporting event, an action by a performing party, a non-performance by a performing party, etc. For example, a contract may include data elements to determine if a triggering event occurred. In one embodiment, the triggering event may be if action A was performed by a performing party B at a specific time C. Based upon the contract, the protocols may be such that if the action A was performed by the performing party B at a specific time C, then contract outcome=X. On the other hand, if the action A was not performed by a performing party B at a specific time C, then contract outcome=Y. As mentioned above, the subject matter associated with a contract may include a contract for services, contract for goods, a contract for land, an insurance contract, a contract for non-performance, a wager or competition, wherein each user has a competitive position regarding a real time event or an outcome of a real time event, a securities contract, a contract related to commodities or currencies. However, it is also understood that other agreements between parties may be included and are within the spirit and scope of present invention.

By way of another example, if the triggering event is related to a wager or competition between first user and the second user, information may be received from the first user computing device 112 associated with a first user corresponding to the first user's competitive position or business position regarding a real-time event. For example, the first user may select a certain team to win a sporting event, a specific currency or commodity to rise or fall a certain amount, prop bets, or any other selection associated with a real-time event. The information selected by the first user may be transmitted to a second user computing device associated with a second user identifying the real-time event the information related to the first user's position related to the real-time event. This information informs the second user of the first user's desire to initiate a real-time competition or offer to enter into a contract, and identified the real-time event, such as commodity valuation, a sporting event, etc. Next, information is received from the second user computing device 122 corresponding to the second user's position regarding the real-time event, such as a selection of a different commodity, etc. The triggering event may be if sports team A wins or loses a certain sporting event. In such an example, the protocols may be such that if the sports team A wins, then the first user shall pay a certain amount to the second user and if sports team A loses, then the second user shall pay a certain amount to the first user. By way of another example, the protocols may be such that if a certain commodity or currency rises or falls to a certain value by a certain point in time, then the first user shall pay a certain amount to the second user and if the commodity does not, then the second user shall pay a certain amount to the first user.

The database 104 may be configured to store and include contract outcome information for the contract. The contract outcome information includes data elements associated with a contract outcome of a contract based upon a triggering event that is intended to occur in the future. The contract outcome may be based upon the logic, contract protocols, instructions or conditions associated with the contract that may be satisfied related to the triggering event. The contract outcome information may be provided from outside sources or the contract outcome information may be created by the code, system or software. Using one of the examples above, a contract may include data elements to determine the contract outcome based if a triggering event occurred such as performance of an action A by a performing party B at a specific time C has occurred. If the action A was performed by the performing party B at a specific time C, then contract protocols may dictate that the contract outcome=X. On the other hand, if the action A was performed by a performing party B at a specific time C, then contract protocols may dictate that contract outcome=Y. In the above example, X and Y is the contract outcome. Another example of a contract outcome may be an outcome of the real-time event relative to the first user's competitive position and the second user's competitive position related to the wager or peer to peer competition described above. The contract outcome X and Y may include a performance, non-performance, payment of either the first user, second user or another party by the first user, second user or another party.

The database may also store disputed information related to the contract outcome. The disputed information includes data elements associated with information received if the first user or second user disputes the contract outcome. The disputed information may be received, over the communications network, from information and data input by the first user on the first user computing device, from information and data input by the second user on the second user computing device, or from other application such as the forth party application. In one embodiment, the apparatus, code, methods and systems may be configured to interface with other applications such that the it receives the disputed information in a packet after the triggering event has occurred and after either first user or second user has disputed the contract outcome. In one embodiment, the contract protocols include the outcome of the contract after a triggering event has occurred. For example, the apparatus, code, methods and systems may be configured such they determine the contract outcome based upon data associated with the outcome of the real-time event relative to the first user's competitive position and the second user's competitive position related to the wager or peer to peer competition described above. In such an embodiment, the apparatus, code, methods and systems may be configured to pull data or receive from the information sources and databases to calculate the contract outcome. For example, information sources for sporting events may include database is related to ESPN™ CBS-SportsNet™. The disputed information may include data elements disputing the following: the triggering element, triggering element date, triggering element time, subject matter of the triggering element, portions of the triggering elements, contract outcome, the proposed outcome, logic why the contract outcome is disputed, portions of the proposed outcome etc. Additionally, other data may also be disputed and is within the spirit and scope of the present invention.

Figure 9:
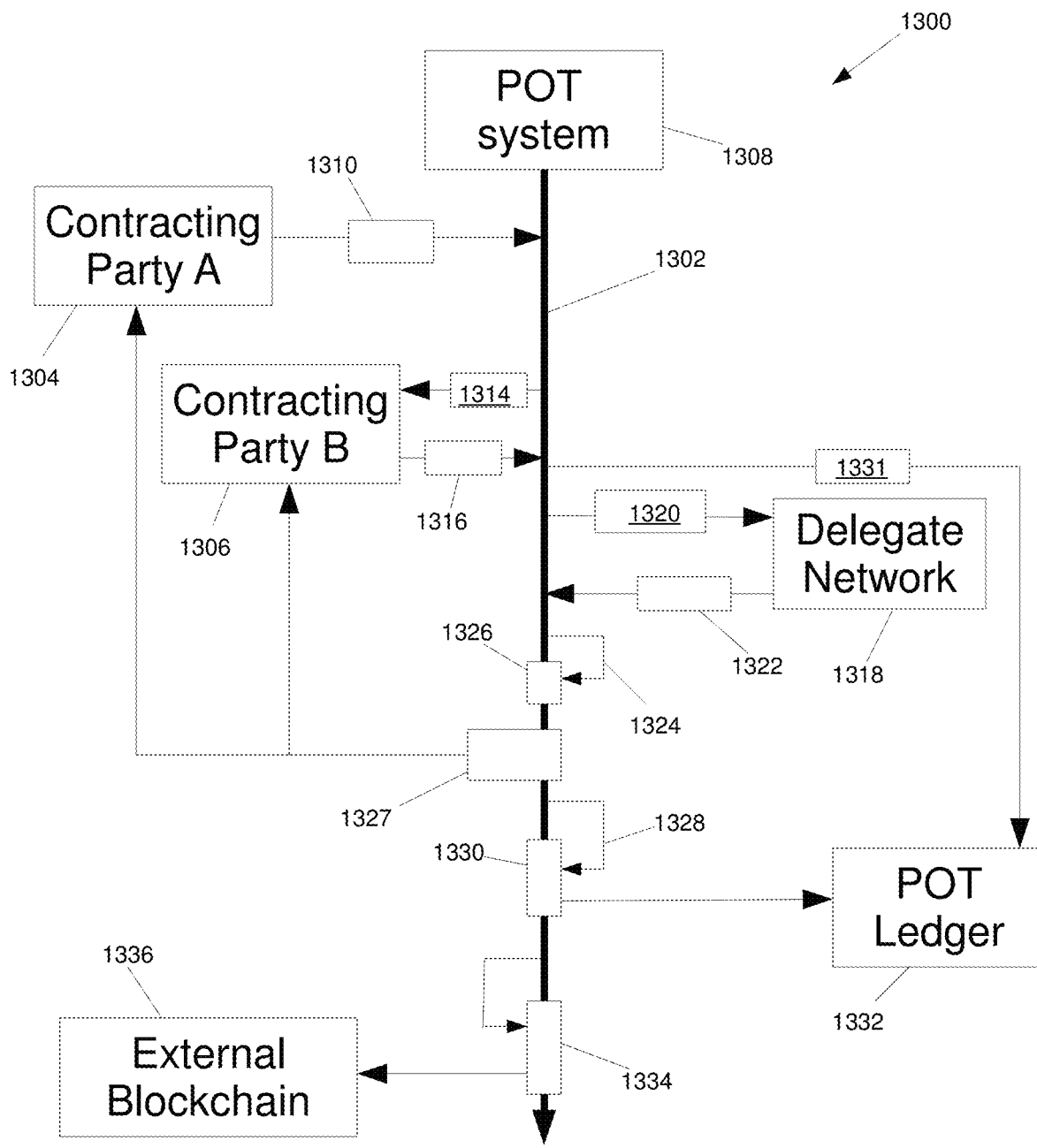
FIG. 9 is a diagram of a method and system for storing data in accordance with the principles of the invention.

The database may also be configured to store third-party decision information associated with the decision on the disputed information. Third-party decision information may include data elements associated with a third-party analysis of the disputed information. In one embodiment, third-party decision information may be input received via a graphical user interface associated with the third-party computing device 132 (as illustrated in FIG. 1) and also as illustrated in FIG. 9. In other embodiments, the third-party decision information may be received from other information sources and methods without having received data via a graphical user interface. For example, the third-party decision information may be received without displaying a graphical information when the apparatus, code, methods and systems of the present invention are configured to integrate with third-party databases or automated systems and algorithms. The third-party decision information may include data the disputed information, third-party contract outcome, and third-party analysis for the disputed information. Third-party outcome includes the third-party determination of the outcome of the contract based upon a triggering event, protocols associated with the contract and the analysis conducted by the third-party. The third-party decision information may include data elements that reflect whether the third-party outcome agrees or disagrees with the proposed outcome of the disputed information. For example, if the disputed information in the example above includes data elements that the contract outcome does not equal X, then third-party decision information may include a third-party analysis or logic for why the contract outcome does or does not equals X, does or does not agree with the proposed outcome information of the disputed information, that the contract outcome equals Y, or the information that includes data elements that the third-party decision information partially agrees with proposed outcome. By way of another example, if the disputed information includes data elements disputing the outcome of a wager, then the third-party decision information may include a third-party analysis or logic why the third-party decision information agrees or disagrees with the disputed information, or partially disagrees or agrees with the information. The third-party disputed information may also include data elements suggesting various changes and amendments to the underlying agreements associated with the contract.

The database may also be configured to store status information. In one embodiment, the status information is configured to display on the first or second graphical user interface graphical representations or a first graphical representation. Status information may be defined as information regarding the status of pending disputed information prior to the first or second user receiving their verified outcome associated with disputed information. In some embodiments, status information may include data elements for displaying graphical representations including an informative experience displaying the disputed information relative to the verified contract outcome.

The database may also be configured to store consensus contract outcome information associated with the contract outcome. The apparatus, code, methods, and systems are configured for determining a consensus contract outcome based upon third-party decision information received. The consensus contract outcome is derived from a threshold of third-party decision information being in agreement with each other. Consensus contract outcome information may include data elements including the threshold number, third-party decision information from each third-party, time relative to when the consensus contract outcome was calculated, times relative to the third-party decision information etc. The threshold may be adjustable. In one embodiment, the threshold number may be a simple majority vote, a three fourths majority, a vast majority etc. In certain embodiments, the consensus information may be based on a portion or entirety of each of the third-party decision information. Additionally, other embodiments and algorithms may be used for determining a consensus contract outcome information. The consensus contract outcome information may also include information for displaying data associated with the consensus contract outcome information related to the verified contract outcome on the graphical user interface of either the first computing device 112, second computing device 122 and third computing device 132.

The database may also be configured to store third-party rating information associated with a rating or ranking of each third-party. Third-party rating information may be stored in each third-party record wherein each third-party record may be created and stored in the database. The third-party rating information may be defined as and include data elements for a ranking or rating of the third-party, penalty information related to third-party decision information not matching the consensus contract outcome information or parts thereof, benefit information related to third-party decision information corresponding to the consensus contract outcome or verified contract outcome or parts thereof.

Third-party reward information may be a reward, benefit or incentive for the third-party and may include data elements associated the third-party reward received by the third-party based upon the third-party decision information and may include the penalty information and benefit information related to each third-party decision. The third-party reward information to be stored in each third-party record.

In one embodiment, if contract outcome information is contested or disputed and the third-party decision information is confirmed as correct or matching portions or the entirety of the consensus contract outcome information, then data elements reflecting a reward or benefit may be included or added to the third-party rating information thereby increasing the ranking or rating of the third-party, which may also be reflected in the third-party reward information. In certain embodiments, the benefit may be that the rating is not decreased. In one embodiment, the third-party rating information may correspond to an amount of monetary compensation received by each third-party. In other embodiments, the third-party rating information may correspond to a non-monetary compensation received by the third-party. In certain embodiments, the third-party rating information that corresponds to the order in which each third-party receives the disputed information.

The third-party reward information may also include a graphical representation related to each third-party decision information. In one embodiment, the graphical representation may include an informative experience. In one embodiment, the informative experience may be an entertaining experience, such as the stacking of coins, funny videos, countdown timer so that the third-party can make self-competition and compete against others. In one embodiment, the code, systems and methods are configured providing, over the communications network, to the third graphical user interface a third graphical representation related to a third-party reward. The third-party reward may include an information and/or entertaining experience.

In one embodiment, the verified contract outcome includes the consensus contract outcome information of the consensus contract outcome if the contract outcome was disputed and may also include the contract outcome if the contract outcome was not disputed. By way of another example, if contract outcome information is contested or disputed and the third-party decision information is found to be incorrect or not matching portions of the entirety of the consensus contract outcome information, then data elements reflecting a penalty may be included or added to the third-party rating information thereby decreasing or degrading the ranking or rating third-party.

FIG. 1 shows an embodiment of the present invention wherein networked computing devices 112, 122, 132 and network 130, application 170 interact with server 102 and repository 104 (it should be noted that the third-party network may include numerous third-parties having multiple devices) over the network 106 and blockchain 160. Server 102 includes a software engine that delivers applications, data, program code and other information to networked computing devices 112, 122, 132 and third-party network 130. It should be noted that although FIG. 1 shows only the networked computers 102, 112, 120, 122, 130, 132, the system of the disclosed embodiments supports any number of networked computing devices connected via network 106. Further, server 102, networked computers and systems 102, 112, 120, 122, 130, 132 and application 170 includes program logic such as computer programs, mobile applications, executable files or computer instructions (including computer source code, scripting language code or interpreted language code that may be compiled to produce an executable file or that may be interpreted at run-time) that perform various functions of the disclosed embodiments.

Note that although server 102 is shown as a single and independent entity, in one embodiment, the functions of server 102 may be integrated with another entity, such as one of the devices 112, 120, 122, 132, payment authority or social network. Further, server 102 and its functionality, according to a preferred embodiment, can be realized in a centralized fashion in one computer system or in a decentralized distributed fashion wherein different elements are spread across several interconnected computer systems.

FIG. 1 illustrates that the first user 110 may be associated with the remote computing device 112 and the second user 120 may be associated with remote computing device 122. Information and data may be transmitted to and from the devices 112, 122. Information or data may be displayed on the graphical user interfaces associated with each remote computing device. Additionally, a user may select an icon or other graphical representation on the display by interfacing with screen with a swipe or swiping gesture, push or other means of indicating a user preference. The graphic user interfaces may be configured for displaying information and receiving input from users and are well known to those skilled in the art.

As briefly mentioned above, each third-party 131 associated with the third-party network 130 may also be associated with a remote computing device 130. Information and data may be transmitted to and from the devices 132. Information or data may be displayed on the graphical user interfaces associated with each remote computing device 132. Additionally, a user may select an icon or other graphical representation on the display by interfacing with screen with a swipe or swiping gesture, push or other means of indicating a user preference. The graphic user interfaces may be configured for displaying information and receiving input from users and are well known to those skilled in the art.

FIG. 1 may also include a fourth-party application 170. In one embodiment, the forth-party application represents a software application or system configured to allow first user 110 and second user 112 to form a Smart Contract with each other. As mentioned above, the forth party application may be configured for sending or receiving information related to the contracts related to the first user and second user to the system. In one embodiment of the present invention, the forth-party may include a payment gateway, which is an e-commerce Application Service Provider (ASP) service that authorizes and processes payments from one party to another.

Figure 2:
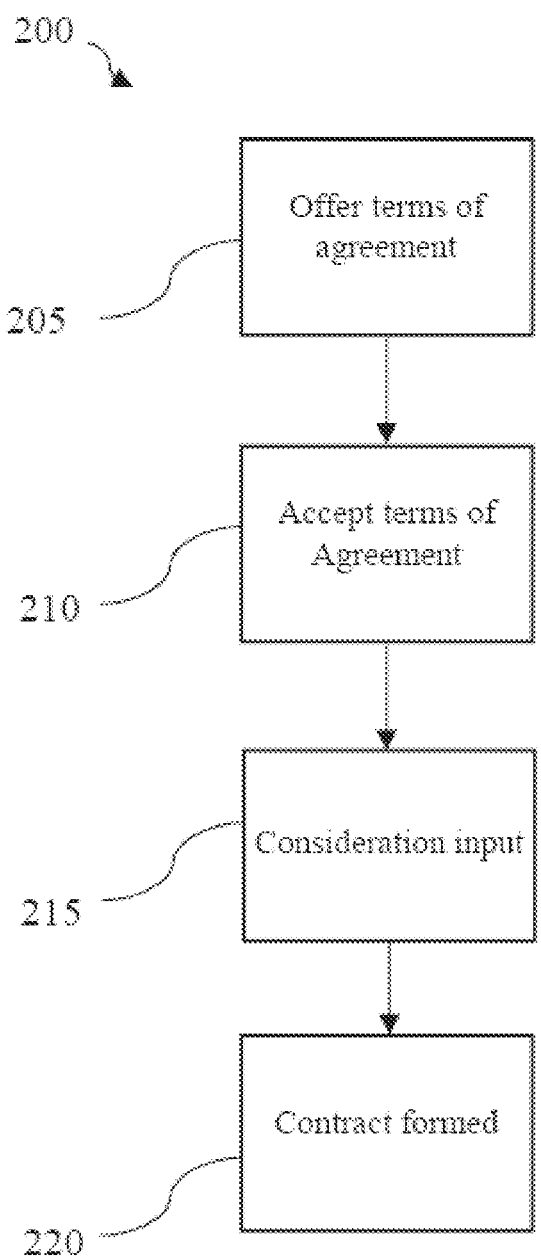
FIG. 2 is a block diagram showing the data flow pertaining to the first and second user entering into a smart contract for the apparatus, code, methods, and systems for confirming, modifying, causing to be performed and recording outcome related to contracts between a first user and a second user, according to an example embodiment.

FIG. 2 is a block diagram showing the process 200 pertaining to the users entering into a smart contract for the apparatus, code, methods, and systems for confirming, modifying, causing to be performed and recording outcome related to contracts between a first user and a second user, according to an example embodiment. This process can take place on a fourth party application 170 that is in communication with the communications network. In operation, in step 205, a first user 120 would make an offer for entering into an agreement. As mentioned above, the terms of the offer may include an offer and to enter into a contract for goods, services, insurance, to pay a debt, to borrower loan money, and a wager, peer to peer competition, contract for land, etc. It is understood that other types of contracts may also be entered. The fourth party application may be configured such that the first user 110 may input data related to the terms of the agreement via the graphical user interface of the computing device 112. Next, the data related to the terms of the offer to enter the terms of the agreement may be transmitted over the network to the second user.

Next, in step 210, the second user may view the terms of the contract proposed by the first party on the remote computing device 122 of the second user. In operation, the second user may accept the terms of the contract by entering data or input into the graphical user interface of the device 122 of the second user. Additionally, in certain embodiments, the second user may provide a counter offer to the first user's offer by entering input into the graphical user interface of the device second user. If the second user accepts the offer of the first user, then data related to acceptance of the offer will be transmitted over the communications network to the first user. On the other hand, if the second user, provides a counter offer to be first party's offer, then the counteroffer will be provided to the first user for acceptance, rejection or counteroffer. This process will continue until all terms of the agreement had been agreed to by both the first and second party. As mentioned above, the fourth party application be configured for facilitating the first user and second user entering contract.

Next, in step 215, either the first, second, or first and second user may provide consideration to enter into the contract. In one embodiment, if the consideration is payment of money from either the first or second user, then the fourth party application 170 may provide a display to the graphical user interface of either the first or second user's device so that either the first or second user may input their payment information. In certain embodiments, in step 215, for certain contracts were payment is required, the fourth party application may require that the electronic payment information must be received by either the first or second user for the contract to be performed. In one embodiment, electronic payment information may comprise identifying information and any data garnered from a purchase card (i.e., purchase card data), as well as any authentication information that accompanies the purchase card. Purchase card data may comprise any data garnered from a purchase card and any authentication information that accompanies the purchase card. In one embodiment, electronic payment information may comprise user login data, such as a login name and password, or authentication information, which is used to access an account that is used to make a payment. The fourth party application may include a payment authority that may accept payment via the use of purchase cards i.e., credit cards, charge cards, bank cards, gift cards, account cards, EFT payment, wire transfers, cryptocurrency, such as Icash™. After payment is been received, in step 220, a contract has been formed. As mentioned above, the contract is intended to be a Smart Contract.

Figure 3:
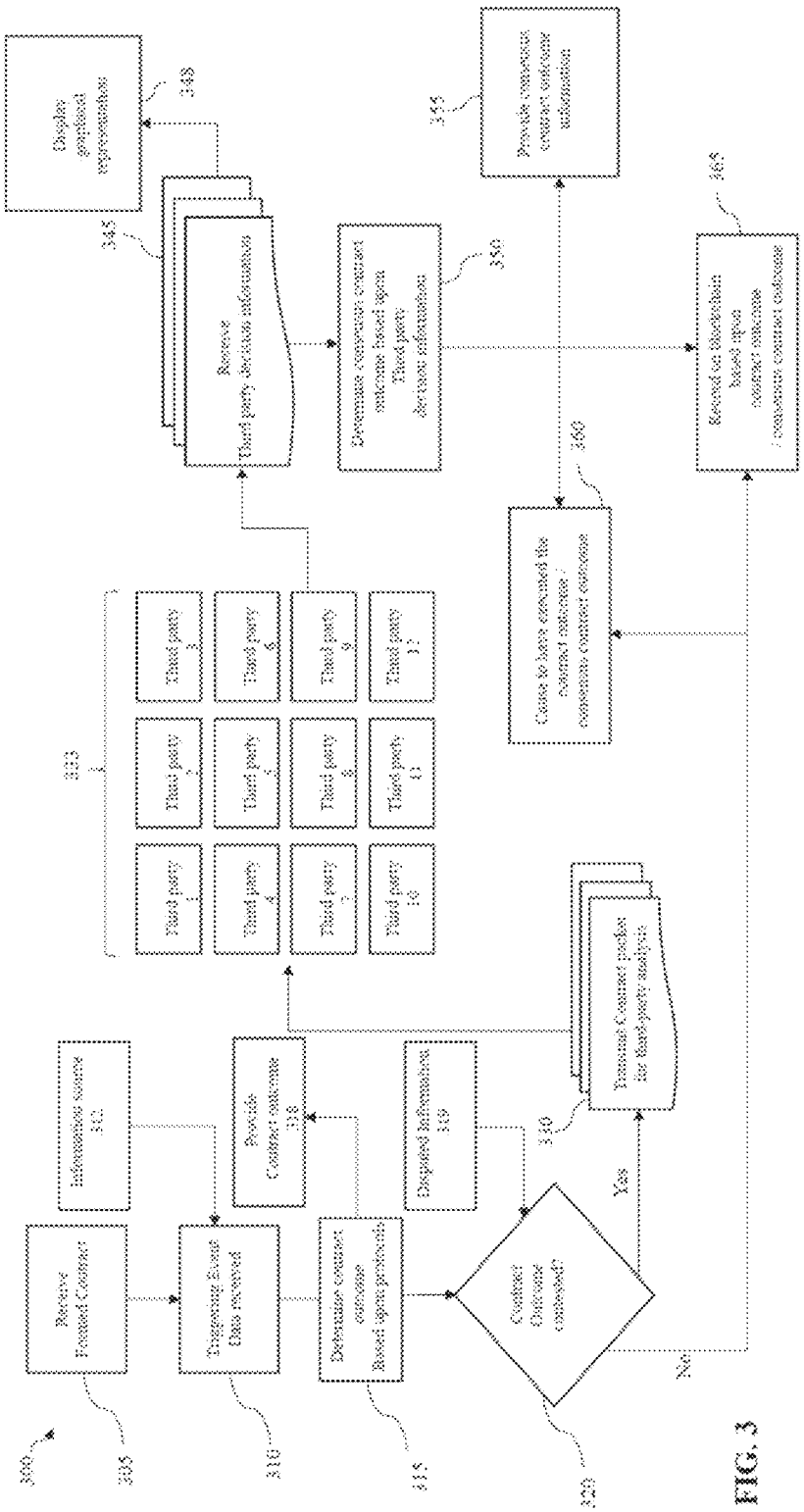
FIG. 3 is a block diagram showing the process flow pertaining to reviewing disputed information of the contract for the apparatus, code, methods, and systems for confirming, modifying, causing to be performed and recording outcome related to contracts between a first user and a second user, according to an example embodiment.

FIG. 3 is a block diagram showing the process flow 300 pertaining to reviewing disputed information of the contract for the apparatus, code, methods, and systems for confirming, modifying, causing to be performed and recording outcome related to contracts between a first user and a second user, according to an example embodiment. The system is configured for receiving over the communications network, for each contract for between the first and second user, contract protocols associated with a triggering event intended to occur in the future. In one embodiment, in step 305, the contract between the first and second users may be transmitted and received from the fourth party application 170. In other embodiments, the contract information is not received until either the first or second user disputes the contract outcome.

Next, a triggering event that was scheduled to occur in the future occurs. As a result, the system may be configured for receiving the triggering event data from a variety of information sources 312, including the fourth party application 170. As mentioned above, the triggering event may be related to a commodity or security, a sporting event, an action by a performing party, a non-performance by a performing party, etc. For example, a contract may include data elements to determine if a triggering event occurred such as performance of an action A by a performing party B at a specific time C has occurred. If the action A was performed by the performing party B at a specific time C, then contract protocols may dictate that the contract outcome=X. On the other hand, if the action A was performed by a performing party B at a specific time C, then the contract protocols may dictate that the contract outcome=Y. As mentioned above, the subject matter associated with a contract may include a contract for services, contract for goods, a blockchain transaction, insurances policies, a contract for land, a contract for non-performance, and a wager or competition, wherein each user has a competitive position regarding a real time event or an outcome of a real time event.

Using one of the examples above, the triggering event may be if sports team A wins or loses a certain sporting event. In such an example, the contract protocols may be such that if the sports team A wins, then the first user shall pay a certain amount to the second user and if sports team A loses, then the second user shall pay a certain amount to the first user. Let us assume that in such an example sports team A wins the certain sporting event. The triggering event information associated with the certain sporting event or real-time event may be transmitted from the fourth party application or another information source to the system. In other embodiments, the triggering information associated with the certain sporting event may be received from a plurality of other information sources 312 and data sources, such as ESPN™ etc. Such information and data sources may be websites, databases, data input via remote computing devices, auditors, television news feeds, almanacs, social media, first user computing device, second user computing device, the fourth party application as well as many other ways for determining if a triggering event has occurred.

Next, in step 315, based upon the contract protocols embedded in the smart contract, the system may be configured to determine a contract outcome and associated contract outcome information. In one embodiment, the system may be configured, in step 318, to provide the contract outcome to the user interfaces of the first computing device 112 and second computing device 122 so that the first and second users may view the contract outcome to determine if they desire to dispute the contact outcome. However, in other embodiments, the fourth party application be configured for determining the contract outcome and associated contract outcome information. In such embodiments where the fourth party application also determines the contract outcome, the fourth party application may also be configured for providing contract outcome information to the user interfaces of the first computing device 112 and second computing device in the 122 so that the first and second users may view the contract outcome.

Using the contract between the first and second users related to the sporting event example above, the system may be configured for using the contract protocols to determine the contract outcome based upon the triggering event information about the certain sporting event or real-time event. The contract protocols may include a first competitive position for the first user associated with the sporting event or real-time event, a mutually exclusive second competitive position for the second user associated with a sporting event or real-time event wherein the first and second competitive positions may include odds or other protocols for payment of the wager. As mentioned above, the fourth party application may also be configured for determining the contract outcome information, such as an insurance policy coverage.

In the example above where sports team A loses, the protocols require that the first user was required to pay the second user a certain amount. After the contract outcome has been determined, then the system is configured for providing a predetermined amount of time to wait before recording the transaction of the block chain. The predetermined amount of time for allowing the contract outcome to be contested may be varied depending on the application, the contracts, the first and second users, as well as other factors.

Next, in step 320, the system is configured for determining if the contract outcome has been contested. As mentioned above, the system is configured for receiving, over the communications network, within the predetermined amount of time after the triggering event information has been received, disputed information associated with the contract outcome from either the first or second user computing devices 112, 122, respectively. In the present embodiment, the system may be configured for receiving disputed information from the fourth party application. In other embodiments, the system may be configured for receiving disputed information directly from the first user device or second user device.

Next, if no disputed information is received within the predetermined amount of time, then the process moves to process 360 and 365. In step 360, the system is configured such that it causes the contract to be performed such that the verified contract outcome corresponds with the contract outcome. In one embodiment, the system is configured for providing instructions or protocols to the fourth party application to execute the payment instructions. In one embodiment, the system is configured to provide data elements that block or allow payments to be made or other protocols to be executed. Referring back to the example above, where sports team A wins the certain sporting event requiring that the first user pay the second user certain amounts, then then the system may transmit an instruction or data elements to the fourth party application, escrow entity, bank, or other payment authority, to execute the contract protocols and transmit payment to the second user. In step 365, the system is configured for recording or having the contract outcome information mined onto a distributed ledger of the block chain (which is further explained below and illustrated in FIG. 4) or another public ledger. It is understood that recording of the transaction is defined to mean having the contact outcome information mined by a decentralized network to the block chain and in other embodiments recording of the transaction may be defined as allowing that a decentralized server records the transaction to the block chain.

On the other hand, if disputed information is received by the system provided by either the fourth party application, the first user remote computing device, or the second user remote computing device within the predetermined amount of time, then the process moves to step 330. In step 330, if disputed information is received by the system from either the first user computing device or second user computing device directly or through the fourth party application, then the system transmits a packet of data to each of the plurality of third-parties 333. As mentioned above, the disputed information includes data and information that the disputing party (first user or second user) is disputing based upon the contract outcome for the contract. The disputed information may also include information related to what the disputing party (first user or second user) believes to be the proposed contract outcome. As mentioned above, the disputed information may include data elements disputing the following: the triggering element, triggering element date, triggering element time, subject matter of the triggering element, portions of the triggering elements, contract outcome, the proposed outcome, logic why the contract outcome is disputed, portions of the proposed outcome etc. Additionally, other data may also be disputed and is within the spirit and scope of the present invention.

Upon receiving the disputed information, each of the third-parties will conduct a third-party analysis of the disputed information to determine the outcome of the disputed contract. As mentioned above, in one embodiment, the third-party may be inputting data and receiving data via a remote computing device 132. In one embodiment, the apparatus, code, methods, and systems are further configured to provide graphical representations to a graphical user interface of the third-party computing device so that the third-party may view the disputed information. The graphical user interface may be configured for receiving the third-party decision information 345. In one embodiment, the third-party information comprises data elements or code related to if the third-party agrees, disagrees or partially agrees or partially disagrees with the disputed information. In other embodiments, the third-party decision information may include data input inform at least a gesture or other input data from the third-party for at least one of agreeing and disagreeing with the disputed information. Additionally, the gesture or other input data may also be configured to provide partial agreement and partial disagreement with the disputed information. For example, FIG. 9 illustrates a computing device 901 having a graphical interface 905 having icons 910 for a third-party to either accept or deny a transaction. In other embodiments, the disputed information may be provided to a third-party that are systems or applications configured for using algorithms and other logic for determining an outcome of the disputed information.

While the each of the third-parties is analyzing the disputed information, in step 348, the system may be configured for providing status information to the graphical user interfaces of either the first party computing device 112 or second-party computing device 122. The status information is configured to display on the first or second graphical user interface a first graphical representation related to a status of the disputed information. The status information may provide a first informative experience or entertaining experience. In one embodiment, the first informative experience may be configured for displaying the disputed information relative to a subject matter associated with the contract (such as illustrated in FIG. 7A-8B). In one embodiment, the informative or entertaining experience may be associated or not associated with the subject matter of the underlying contact or disputed information.

As mentioned above, before the consensus contract outcome is determined, which may have any suitable duration, the results of the comparisons between the live feed and the positions of the different users can be displayed in real-time to provide the users with their current standings relative to each other user or relative to the what could be the consensus contract outcome. The duration of time for the consensus contact outcome to be determined and received may vary greatly, with exemplary durations being based on set periods of time, or any other duration.

By way of an example, a user provides disputed information related to policy coverage of an insurance policy. Then, in step 345, assuming an increasing amount of third-party determinations is received from the feed that agree with said user that the contract outcome is not correct, then in step 348 a graphical representation having an entertaining experience may be displayed, such as a graphical representation of sporting events (football games, boxing matches, soccer matches, basketball tournaments, etc.), and the like illustrating the increasing probability that the consensus contract outcome will align with said user's position. By way of another example, assuming in step 345 an increasing amount of third-party determinations is received that agree with the position of the user, an increasing probability that the consensus contract outcome will align with said user's position may be displayed in step 348 as a boxer beginning to overcome his opponent. By way of another example, in step 345 assuming an increasing amount of third-party determinations is received that agree with the position of the user, then an increasing probability that the consensus contract outcome will align with said user's position may be displayed in step 348 as an American football player catching a long pass or scoring a touchdown. By way of another example, in step 345 assuming a decreasing amount of third-party determinations is received, then a decreasing probability that the consensus contract outcome will align with said user's position may be displayed in step 348 as the quarterback of an American football player throwing an interception or a missing a tackle. As the feed of third-party determinations is received, the graphical representation of an entertaining experience displayed may be updated so that the victor of the entertaining experience corresponds with the consensus contract outcome that aligns with the user position that selected the correct outcome. For example, if a first user's contract position aligns with the consensus contract outcome, then the victor of the entertaining experience (the winner of the football game, boxing match, race etc.) will be such that the first user's entertaining experience reflects that the first user won the competition. Alternatively, if a first user's contract position does not align with the consensus contract outcome, then the victor of the entertaining experience (the winner of the football game, boxing match, race etc.) will be such that the first user's entertaining experience reflects that the first user lost the competition.

FIG. 3 illustrates numerous third-parties 333 that may be configured for analyzing the disputed information so that each third-party may transmit a third-party decision the system. In one embodiment, the apparatus, code, methods, and systems of the present inventions are further configured for assigning a rating to each third-party (further explained below and further illustrated in FIG. 5). In one embodiment, the apparatus, code, methods, and systems are configured for transmitting, over the communications network, disputed information to the third-parties in a predetermined order corresponding to the rating of each third-party. FIG. 3 illustrates that in the present embodiment, twelve separates third-parties or third-party systems are configured to receive the disputed information when the system receives information related to a disputed contract. For example, in FIG. 3, the third-party labeled one may have the highest rating and the rating may decrease as the number increases (for example third-party labeled 2 may have the second highest rating, the third-party labeled 3 may have the third highest rating, and so on). In the present embodiment, each of the third-parties are assigned a number associated with their rating corresponding to the predetermined order in which the system transmits information to the third-party. However, it is understood that other systems for rating may also be used and are within the spirit and scope present invention. Each of the third-parties are incentivized to retain a high rating by providing data that is correct. Additionally, each of the third-party ratings may be reduced if a third-party provides data that is incorrect. It is crucial to note that all third-parties will function independently with no direct correlation to users of the application or the Blockchain protocol that Smart Contracts are being propagated on.

In step 345, the system receives, over the communications network, third-party decision information associated with the disputed information from each third-party that performed the third-party analysis of the disputed information. The third-party decision information may be input by a third-party via the graphical user interface of the third-party computing device. In other embodiments, the third-party decision information may be received via data elements or other code.

Next, in step 350, the apparatus, code, methods, and systems determine a consensus contract outcome based upon third-party decision information received. The consensus contract outcome comprises a threshold of third-party decision information agreeing or matching. In one embodiment, the threshold is at least a 50% match of third-party decision information from each third-party. In other embodiments, the threshold is at a least 75% match of third-party decision information each third-party. However, other thresholds may be used and are within the spirit and scope of the present invention. One of the benefits of the current invention is that it allows a decentralized network of third-parties acting independently of one another for making decisions. The threshold allows the system to determine the level of confidence or trust of the third-party decisions. As a result, the inefficiencies and discrepancies of the "house" or decision-makers is greatly reduced.

Using one of the examples above, the triggering event may be if sports team A wins or loses a certain sporting event. In such an example, the contract protocols may be such that if the sports team A wins, then the first user shall pay a certain amount to the second user and is sports team A loses, then the second user shall pay a certain amount to the first user. The protocols may also include a first competitive composition or odds related to the sporting event associated with the first user and a second competitive position or odds related to the real-time event or sporting event associated with the second user. Let us also assume in such an example sports team A in real-time wins the certain sporting event or real-life event. The triggering event information associated with the certain sporting event may be transmitted from the fourth party application to the system. In other embodiments, the triggering information associated with the certain sporting event may be received from a plurality of other information sources and data sources. Additionally, the system of the present invention may also be configured for receiving the triggering event information and protocols associated with the sporting events before the triggering event occurs. In such an example, the system may also be configured for determining the contract outcome information via a plurality of other information sources.

In the current example while the sports team won the real-life event, the fourth party application or the system incorrectly provides information that states that the contract outcome information associated with the event was that the sports team A lost the event. In such an example, the fourth party application provided a contract outcome stating that the second user lost the wager. In operation, if the fourth party application provided in incorrect contract outcome information, then, as illustrated in step 319, the second user could enter input data into the second user computing device disputing the contract outcome and providing a proposed outcome, which would be received by the system in step 320. The disputed information may be input into the system using the graphical interface of the remote computing devices of the users. Next, in step 330 the system would transmit the disputed information associated with the contract to the third-parties for analysis by the decentralized network of third-parties 333. Next, in step 345 and 348, before the consensus contract outcome has been determined, the system could provide status information regarding the disputed information to the first and second users the other remote computing devices (as explained above). The status information may include graphical representations having entertaining experiences such as virtual roulette wheel, a virtual slots machine, a sporting competition, portions of a sporting competition, racing and the like (such as illustrated in FIG. 8A-8B). Next, after the consensus contract outcome based upon the third-party decision information has been determined, in step 355, the system is configured for providing consensus contract outcome information to the graphical user interfaces of either the first user computing device 112 and second user computing device 122. The consensus contract outcome information is configured to display on the first and second graphical user interfaces a graphical representation related to the consensus contract outcome. The graphical representation related to the consensus contract outcome may include a second informative experience displaying the disputed information relative to the consensus contract outcome information. It is understood that graphical representations displayed on the first and second graphical user interfaces may also be displayed on the user interfaces associated with the third-parties.

Next, in step 360 the apparatus, code, methods and system are further configured for causing the contract to be performed such that the verified contract outcome corresponds with the consensus contract outcome. In one embodiment, the payment held in escrow may be cryptocurrency. The system may provide instructions to the fourth party applications to execute payment and remit payments basic on the protocols associated with the consensus contract outcome information. Next, in step 365, the system is configured for allowing the consensus contract outcome information to be mined onto or recorded on a distributed ledger or block chain.

Figure 4:
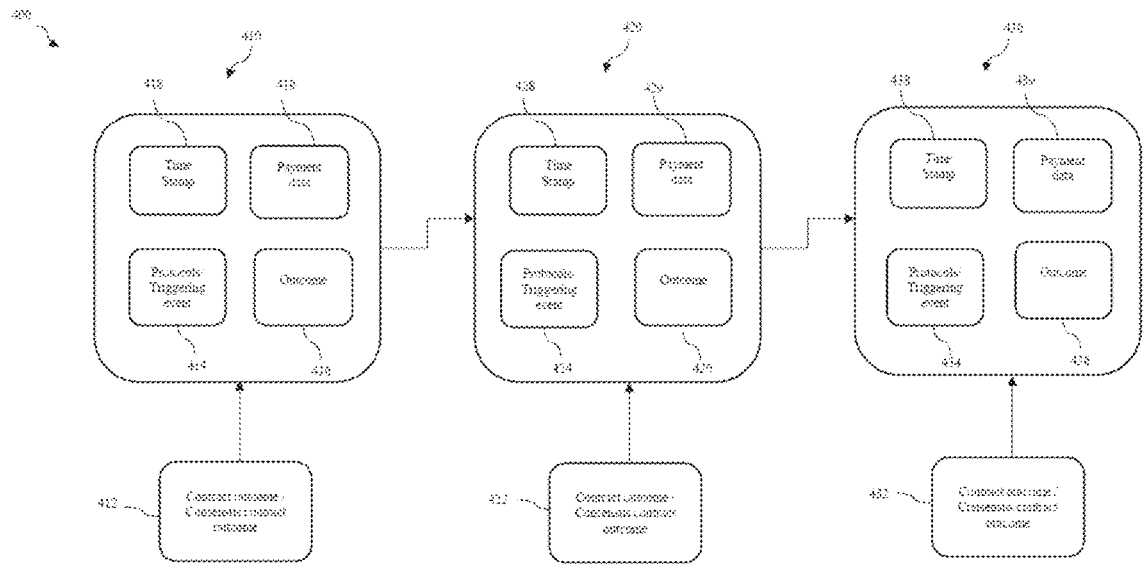
FIG. 4 is a block diagram of the blockchain formation pertaining to reviewing disputed information of the contract for the apparatus, code, methods, and systems for confirming, modifying, causing to be performed and recording outcome related to contracts between a first user and a second user, according to an example embodiment.

FIG. 4 is a block diagram of the blockchain formation 405 pertaining to reviewing disputed information of the contract for the apparatus, code, methods, and systems for confirming, modifying, causing to be performed and recording outcomes and providing proof of trust related to contracts between a first user and a second user, according to an example embodiment. FIG. 4 is a series of transactions that have been recorded or minded on the block chain 160. Each of the recorded transactions include a block 410, 420, 430 having data that has been verified by the system then mined on the block chain. Each block of the block chain may include a timestamp 418, 428, 438 associated with the recorded transaction. Additionally, each block may also include the protocols and triggering event 414, 424, 434 associated with the recorded transaction. Additionally, each block may also include the outcome 416, 426, 436 (contract outcome/consensus contract outcome) associated with the recorded transaction. Additionally, each of the blocks may also include the payment data associated with the transaction. The payment data may include a transfer of consideration between the first user and second user and may include cryptocurrency in other payments methods.

Figure 5:
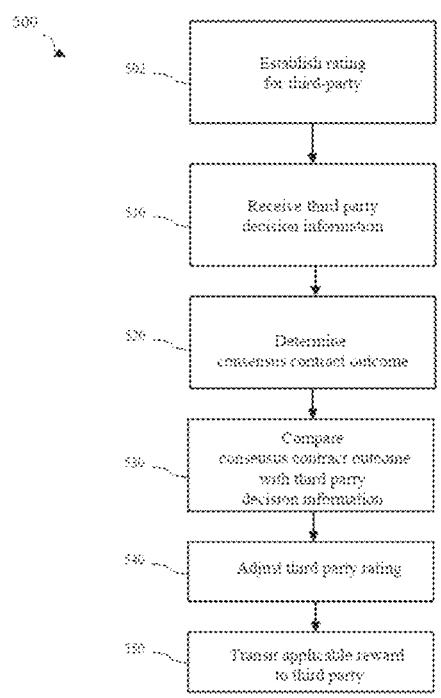
FIG. 5 is a block diagram showing the process flow pertaining adjusting the rating for each third-party for the apparatus, code, methods, and systems for confirming, modifying, causing to be performed and recording outcome related to contracts between a first user and a second user, according to an example embodiment.

Referring to FIG. 5, FIG. 5 is a block diagram showing the process flow 500 pertaining to how adjustment of the rating for each third-party for the apparatus, code, methods, and systems for confirming, modifying, causing to be performed and recording outcome related to contracts between a first user and a second user, according to an example embodiment. In step 502, a baseline rating is assigned to each third-party configured for receiving disputed information. The baseline rating may be stored in each of the third-party records. The baseline rating may be adjusted depending on an application. The baseline reading be adjusted depending on the type third-party, however in other embodiments other systems for assigning ratings may be used that are within the spirit and scope of the present invention. In one embodiment, the baseline rating of the third-party receives a penalty or will be affected in a negative manner if its corresponding third-party decision information does not match or partially match the consensus contract outcome and associated consensus contract outcome information (further explained below and in FIGS. 6A and 6B). In one embodiment the baseline rating of the third-party may be configured to be increased in a positive manner if the third-party decision information matches the or partially matches the consensus contract outcome associated with the consensus contract outcome information. In one embodiment, the system may also determine how much of a penalty, reduction or negative effect to the baseline rating will be recorded in the third-party record based upon the deviation from the consensus contract outcome. Similarly, in one embodiment the system may also determine how much of a reward or benefit or positive element may be added to the third-party rating for third-party decision that matches or partially matches the consensus contract outcome information.

Next, in step 510, the system receives and third-party decision information. Next, in step 520, the system determines the consensus contract outcome. Next, in step 530, the system would compare the consensus contract outcome of the third-party decision information to determine if the third-party decision information matched or partially match the third-party decision information of other third-parties. Next, in step 530, based upon the decision information received from the decentralized network of third-parties, the system will determine the consensus contract outcome. Next, in step 540, the system would adjust the third-party rating based upon whether the third-party decision information was correct (further explained below and in FIG. 6A and FIG. 6B). Next, in step 550, the system would be configured for transmitting an award, if applicable, to the third-party.

FIG. 6A and FIG. 6B will be discussed together. FIG. 6A is a table showing a rating adjustment for the rating for each third-party for the apparatus, code, methods, and systems for confirming, modifying, causing to be performed and recording outcome related to contracts between a first user and a second user, thereby providing proof of trustworthiness of the transaction, according to an example embodiment. FIG. 6B is a formula for calculating a reward based upon third-party rating, for the apparatus, code, methods, and systems for confirming, modifying, causing to be performed and recording outcome related to contracts between a first user and a second user, according to an example embodiment. In one embodiment, the code is configured for transmitting, over the communications network, a third-party reward corresponding to the rating of each third-party. Third-parties are incentivized to retain a high rating for inputting correct data related to third-party decisions and are punished for inputting data related to incorrect third-party decisions. The exact metrics for maximum reward per input will be established independently in each application based on the industry and ecosystem it is working in. In one embodiment, the reward provided to the third-party may be corresponding to a function of the amount of third-party decisions, third-party correct decisions and third-party incorrect decisions and other factors. The amount provided to each third-party for a correct or accurate third-party determination may be a monetary reward as a fee for performing the work of the third-party, which may be based upon an amount of the entire amount of the contract, such as a 0.25% fee, a 0.50% fee, etc.

FIG. 6A and FIG. 6B each reflect one example of how the third-party reward may be calculated and adjusted based upon the third-party rating. Referring to FIGS. 6A and 6B, r is the third-party reward percentage based upon a set maximum fee. In one embodiment, the maximum reward may be of 100% of the fee is the penalty or negative effect of the rating with each incorrect third-party answer, with the yield being the relevant decrease in reward. In other words, with each incorrect third-party decision, the third-party rating decreases, which also exponentially decreases the amount of third-party reward received by the third-party. Referring to FIG. 6A, column 610 refers to the third-party rating, column 620 refers to the amount of incorrect answers, column 630 refers to the adjustment of the third-party reward, column 640 refers to the percentage of the amount of the reward for each third-party.

By way of example, in row 615, the amount of incorrect third-party decisions equals zero. As a result, the third-party has a third-party rating of 100%, has a 20 adjustment or penalty and as a result receives 100% the third-party reward offered for each third-party. It is further understood that having a higher present rating may be considered of benefit given that the third-party receives 100% of the third-party reward. Additionally, other means for increasing the amount of benefits or reward for correct answers may also be used and are within the spirit and scope of the present invention. It is further understood that having a higher present rating may be considered of benefit given that the third-party receives 100% of the third-party reward. In other embodiment, the rating may be provided with a positive benefit as a calculated average of the total number of correct determinations or decisions the third-party has provided for the network—not solely the number of disputes it has been involved in. Additionally, in other embodiments, the third-party may receive a benefit if a third-party decision based upon each disputed contract when compared to the consensus contract disputed information was correct over a predetermined amount of time.

By way of another example, in row 625, the amount of incorrect third-party decisions equals 1. As a result, the third-party has a third-party rating of 99%, penalty of 21 and as a result receives 98% the third-party reward offered for each third-party. By way of another example, in row 635, the amount of incorrect third-party decisions equals 2. As a result, the third-party has a third-party rating of 98%, penalty or adjustment of 22 and as a result receives 96% the third-party reward offered for each third-party. By way of another example, in row 645, the amount of incorrect third-party decisions equals 3. As a result, the third-party has a third-party rating of 97%, penalty or adjustment of 23 and as a result receives 92% the third-party reward offered for each third-party. By way of another example, in row 655, the amount of incorrect third-party decisions equals 4. As a result, the third-party has a third-party rating of 96%, penalty or adjustment of 24 and as a result receives 84% the third-party reward offered for each third-party. By way of another example, in row 665, the amount of incorrect third-party decisions equals 5. As a result, the third-party has a third-party rating of 95%, penalty or adjustment of 25 and as a result receives 68% the third-party reward offered for each third-party.

On the benefits of the present invention is that users will be able to propose a social wager (offer terms of the agreement) to other users on almost any event-from rainfall to elections. Currently, the present invention illuminates unnecessary middlemen who charge per wager fees, slow transaction times, lack of privacy and security, lack of safeguards against potential hacking, and lack of trust between players (i.e. how can players be sure that the other player pays?). Unlike traditional apps on centralized servers, the present invention decentralized nature decentralized is far less susceptible to hacking and will not require numerous middlemen to execute inefficient transactions. Utilizing the blockchain as the back-end platform, the present eliminates many of the uncertainties that plague unregulated markets.

Additionally, the subject matter associated with the contract may also include other types of subject matter. In performing party or non-performing party may be associated with either the first or second user. In other embodiments, the performing party may not be associated with the first or second user. The contract may include data elements configured for displaying on a mobile computing device of a user data associated with the contract.

Figure 7:
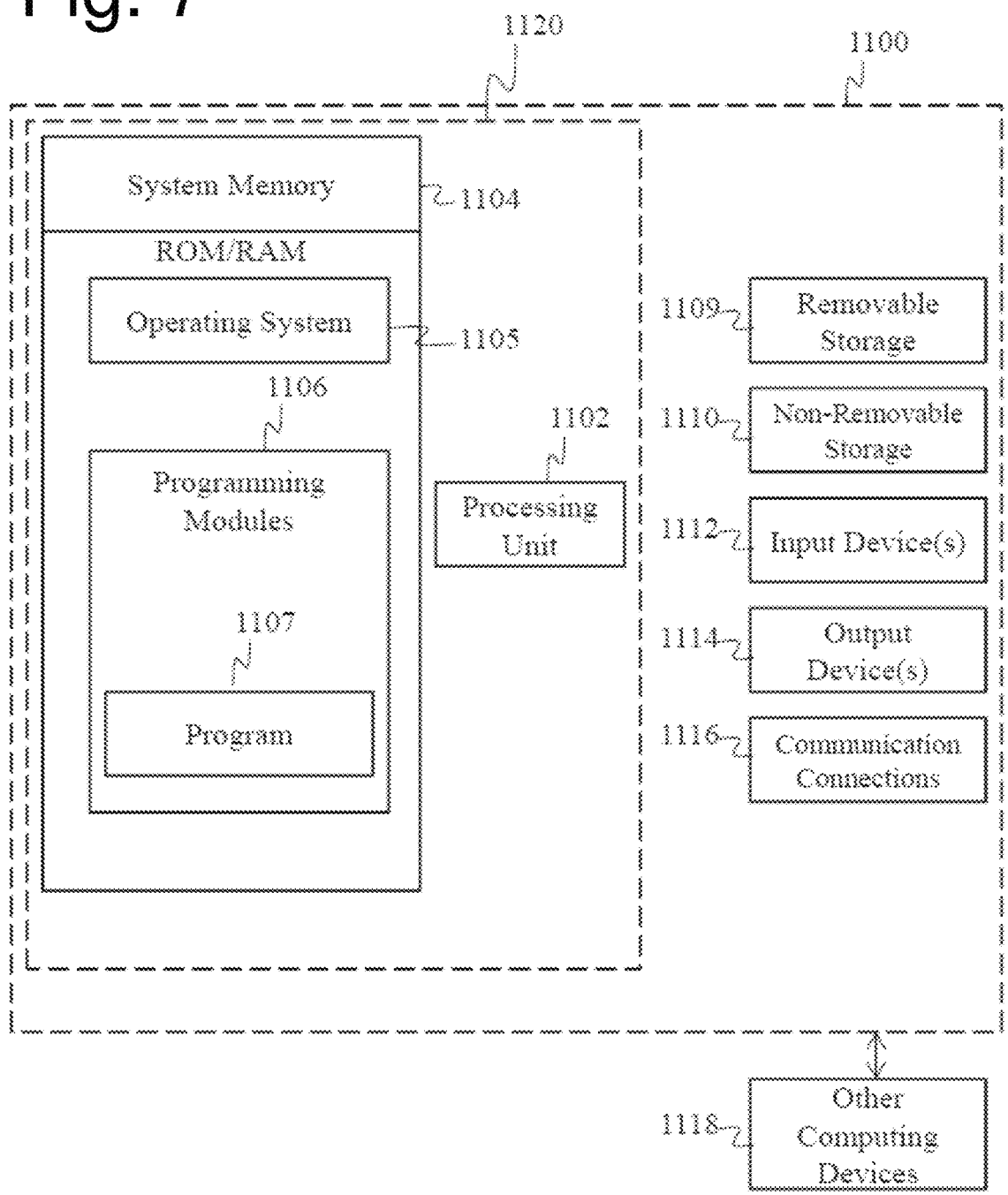
FIG. 7 is a block diagram of a system including an example computing device and other computing devices.

FIG. 7 is a block diagram of a system including an example computing device 1100 and other computing devices. Consistent with the embodiments described herein, the aforementioned actions performed by devices 112, 122, 132 and server 102 may be implemented in a computing device, such as the computing device 1100 of FIG. 11. Any suitable combination of hardware, software, or firmware may be used to implement the computing device 1100. The aforementioned system, device, and processors are examples and other systems, devices, and processors may comprise the aforementioned computing device. Furthermore, computing device 1100 may comprise or be included in the operating environment 100, processes 200, 300, 400, 500 and for implementing graphical displays illustrated in FIGS. 7A-10D as described above. Processes 200, 300, 400, 500 may operate in other environments and are not limited to computing device 1100.

Figure 11:
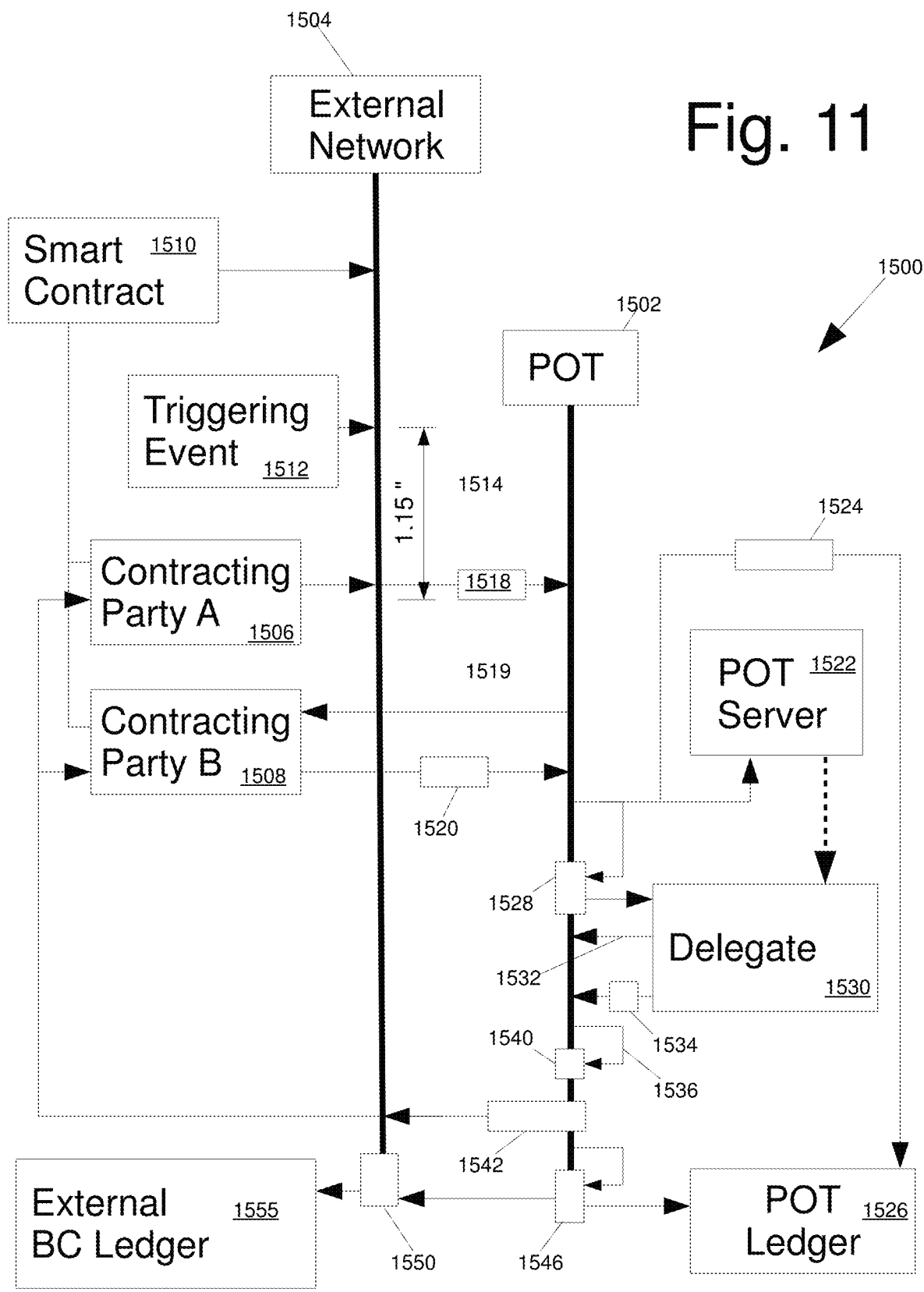
FIG. 11 is a diagram of an alternative embodiment of a method system for storing data in accordance with principles of the invention.

With reference to FIG. 7, a system consistent with an embodiment of the invention may include a plurality of computing devices, such as computing device 1100. In a basic configuration, computing device 1100 may include at least one processing unit 1102 and a system memory 1104. Depending on the configuration and type of computing device, system memory 1104 may comprise, but is not limited to, volatile (e.g. random-access memory (RAM)), non-volatile (e.g. read-only memory (ROM)), flash memory, or any combination or memory. System memory 1104 may include operating system 1105, and one or more programming modules 1106. Operating system 1105, for example, may be suitable for controlling computing device 1100's operation. In one embodiment, programming modules 1106 may include, for example, a program module 1107 for executing the actions of server 102 and devices 112, 122, 132 for example. Furthermore, embodiments of the invention may be practiced in conjunction with a graphics library, other operating systems, or any other application program and is not limited to any particular application or system. This basic configuration is illustrated in FIG. 11 by those components within a dashed line 1120.

Computing device 1100 may have additional features or functionality. For example, computing device 1100 may also include additional data storage devices (removable and/or non-removable) such as, for example, magnetic disks, optical disks, or tape. Such additional storage is illustrated in FIG. 11 by a removable storage 1109 and a non-removable storage 1110. Computer storage media may include volatile and nonvolatile, removable and non-removable media implemented in any method or technology for storage of information, such as computer readable instructions, data structures, program modules, or other data. System memory 1104, removable storage 1109, and non-removable storage 1110 are all computer storage media examples (i.e. memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1100. Any such computer storage media may be part of device 1100. Computing device 1100 may also have input device(s) 1112 such as a keyboard, a mouse, a pen, a sound input device, a camera, a touch input device, etc. Output device(s) 1114 such as a display, speakers, a printer, etc. may also be included. The aforementioned devices are only examples, and other devices may be added or substituted.

Computing device 1100 may also contain a communication connection 1116 that may allow device 1100 to communicate with other computing devices 1118, such as over a network in a distributed computing environment, for example, an intranet or the Internet. Communication connection 1116 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both computer storage media and communication media.

As stated above, a number of program modules and data files may be stored in system memory 1104, including operating system 1105. While executing on processing unit 1102, programming modules 1106 (e.g. program module 1107) may perform processes including, for example, one or more of the stages of the processes 200, 300 and 400 as described above. The aforementioned processes are examples, and processing unit 1102 may perform other processes and may also be configured to provide graphical representations displayed in FIGS. 7A-10D. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip (such as a System on Chip) containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general-purpose computer or in any other circuits or systems.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, or other forms of RAM or ROM. Further, the disclosed methods' stages may be modified in any manner, including by reordering stages and/or inserting or deleting stages, without departing from the invention.

The systems and methods in accordance with the principles of the invention are suitable for generating reliable, immutable records and documentation of transactions such as smart contracts and smart contract outcomes between two or more parties. This is particularly suitable in environments such as undeveloped countries where there are no reliable institutions for recording and enforcing contracts. The present invention is also suitable when the parties to a contract have no prior existing relationship and thus share limited trust. The proof of trust system described below provides confidence to both parties that a contract will be performed according to generally accepted standards. In the methods and systems for storing data explained below, many of the same elements are used as in the above described embodiments of the invention, but may be referred to using slightly different nomenclature. For example, "third-parties" are referred to as "delegates." These terms will have the same meaning unless the context makes clear that a different meaning is intended.

Figure 8:
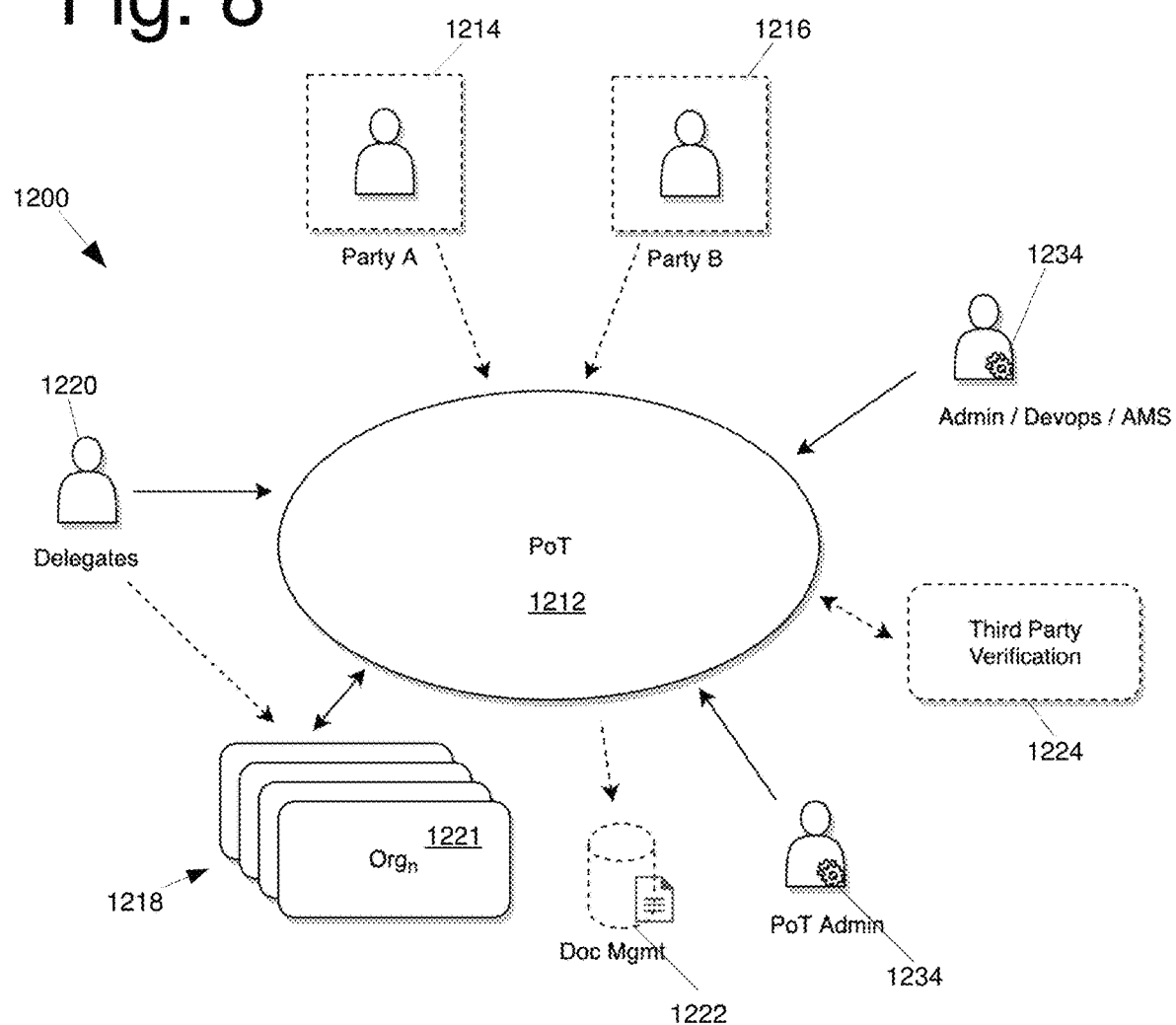
FIG. 8 is a diagram of an environment for a system and method for storing data in accordance with the principles of the invention.

FIG. 8 shows a diagram of a system 1200 for immutably storing reliably accurate data relating to contracts, contractual disputes, and outcomes of those disputes. A proof of trust platform 1212 lies at the center of the system 1200 and intermediates between contracting party A 1214, contracting party B 1216, a dispute resolution network 1218 consisting of several approved delegates 1221, each having knowledge of one or more various contract dispute types. The proof of trust platform includes one or more computing devices. The proof of trust platform may be a central component of a system for storing data comprising a processor and a non-transitory computer readable storage medium storing instructions executable by the processor to cause the system to perform operations in accordance with the principles of the invention.

Unapproved delegates 1220 may request that the proof of trust platform 1200 add them to the dispute resolution network 1218. The proof of trust platform 1200 screens the delegates 1220 to ensure that they meet minimum qualifications prior to designating them as approved delegates 1221 and adding them to the dispute resolution network 1218. In some embodiments of the invention, the approved delegates 1221 forming the dispute resolution network 1218 act as arbiters over disputed contracts, as explained below and as described in reference to "third-parties" above. Delegates are also categorized according to their knowledge and experience regarding different types of contracts and contractual disputes. For example, some delegates may be experienced with insurance claims and would thus be considered appropriate delegates for rendering decisions regarding insurance claim disputes. Other delegates may be experienced with construction contract disputes. The invention may also be used to monitor persons working in government tax revenue departments. In that environment, delegates could be government employees experienced with value-added tax ("VAT") returns. VAT fraud is a serious problem in many countries. A government agency could compare tax determinations from one employee to the decision from a group of delegates who are co-workers of the one employee. If an employee consistently makes dubious decisions regarding VAT returns, it could raise a flag that the one employee is potentially a bad actor involved in VAT fraud schemes such as "missing trader" or carousel VAT fraud schemes.

The system 1200 also includes a secure module 1222 for storing confidential information relating to a contract and/or the contracting parties. Many business contracts include confidential information which the parties would not want to be publicly available. Contractual disputes often involve additional confidential information. If a contract is a smart contract or involves a block chain cryptocurrency, the contracting parties may not wish all of the confidential information associated with the contract and/or a contract dispute to become a permanent part of a blockchain widely accessible to a large number of persons, including nodes of the blockchain. Furthermore, when a dispute arises and delegates are asked whether they wish to participate in resolving the dispute, it is preferable to provide the potential delegates with only nonconfidential information prior to them agreeing to participate in the dispute resolution. Confidential information can be stored on the secure module and access to it may be limited to only parties who need the information. As explained in more detail below, confidential information can be used to generate hashes that become part of the information stored in a blockchain ledger. If the hash functions used to create hashes from the confidential information are only known to certain parties, the confidential information can be stored in an easily accessed blockchain without actually divulging the confidential information. The confidential information could also be stored on a permissioned blockchain such as an internal proof of trust permissioned blockchain so that the confidential information can be verified and confirmed when necessary.

The system 1200 also includes a distributed ledger 1224 of a permissioned blockchain that stores nonconfidential information relating to a contract. Data stored on the distributed ledger 1224 may also include hashes generated by hash functions based on a contract including confidential information stored on the secure document management module 1222 as explained above. The system 1200 also includes administrators 1234 managing the proof of trust platform 1200. The administrators 1234 performing such functions as managing how delegates 1220 are screened prior to being added to the network 1218, acting as nodes for distributed blockchain ledgers, managing the secure module 1222 as well as routine maintenance and updating required for any platform 1200.

FIG. 9 shows a flow diagram 1300 of one embodiment of the invention having relatively low complexity. Element 1302 in FIG. 9 is a timeline of the proof-of-trust platform 1308, where time moving forward is represented as extending in the downward direction. Contracting party A 1304 and contracting party B 1306 have entered into a contract. In this embodiment, the contract is not a smart contract. The parties 1304 and 1306 cannot agree on whether the contract has been performed, and therefore have an unresolved dispute regarding the outcome of the contract. Contracting party A 1304 submits a dispute resolution request 1310, i.e. a request to resolve the contract outcome dispute, to the proof-of-trust ("POT") platform 1308. This dispute resolution request 1310 typically includes the disputed contract outcome, the contract itself, and disputed contract data, i.e. any information associated with the disputed contract outcome. The disputed contract data can include any information which either contracting party believes is relevant to resolving the disputed contract outcome, including for example attached files such as photographs, documents, and records relevant to the contract and performance under it. If only one of the parties submits the initial contract dispute resolution request, as is usually the case, the POT platform 1308 will invite the other contracting party 1306 to submit additional disputed contract data associated with the contract and the disputed contract outcome. The invitation 1306 will typically include a copy of the dispute resolution request 1310 with the invitation. Contracting party B 1306 then submits additional disputed contract data 1316 associated with the disputed contract outcome 1316 to the POT platform 1308. The POT platform 1308 stores confidential data information from dispute resolution request 1310 and the additional disputed contract data 1316 on an internal, secure server. The platform 1308 generates a block 1331 which is stored on a blockchain ledger 1332. The block 1331 includes some or all of the nonconfidential information from the request 1310 an additional data 1316 as well as one or more hashes generated from a hash function applied to confidential information related to the disputed contract. For example, payment terms are often confidential portions of a contract. The dollar amounts of the payments, royalty percentage or other payment terms may be fed to a hash function to generate hashes which are added to the block 1331.

Next, once the POT platform 1308 has received all of the disputed contract data, i.e. the first disputed contract data from contracting party A 1304 and the second disputed contract data from contracting party B 1306, it identifies the nature of the contract and the dispute, and categorizes the contract dispute by assigning a category to the contract dispute resolution request. The same categories are used for the dispute resolution request as are used for the delegates, and this allows the system to select appropriate delegates for evaluating a disputed contract outcome. The platform 1308 then generates a case summary including the dispute reason code and nonconfidential information relating to the disputed contract outcome.

The POT platform 1308 then identifies three or more appropriate delegates 1221 within a delegate network 1318 to analyze and render a decision on the disputed contract outcome. Delegates are identified as appropriate delegates according to the assigned dispute category as well as other factors. The platform 1308 sends these identified appropriate delegates within the network 1318 an invitation 1320 to submit a contract outcome decision. The invitation 1320 includes a case summary, an assigned dispute reason code and nonconfidential portions of the disputed contract data submitted by the parties. Additional invitations 1320 are sent until the minimum required number of delegates have accepted the requests. The delegates accepting the invitation 1320 are then provided case details 1333 including all of the disputed contract, the disputed contract outcome, and all the collected disputed contract data associated with the disputed contract outcome.

After appropriate delegates have reviewed all appurtenant data to the disputed contract outcome, the delegates submit dispute outcome decisions 1322 to the platform 1308. Dispute resolution decisions decisions 1322 include a decision as to the correct contract outcome, and optionally further include an explanation of how the decision was reached. The platform 1308 performs a consensus algorithm 1324 on all of the decisions 1322 in order to generate a consensus dispute outcome 1326. A dispute resolution record 1327 includes the consensus dispute outcome 1326 and optionally includes some or all of the decisions from individual appropriate delegates and/or some or all of the explanations for the decisions provided by some or all of the delegates. The dispute resolution record 1327 is provided to the contracting parties 1304 and 1306.

The platform 1308 also generates a transaction request 1330 which it stores on the POT permissioned blockchain 1332. In this embodiment, transaction request 1330 includes the consensus contract outcome but does not include the individual decisions and explanations rendered by each of the delegates. However, the individual delegate dispute resolution decisions and their explanations may also be included. The blockchain network of the distributed ledger 1332 utilizes its own validation consensus algorithm, thus generating a distributed and validated ledger storing information relating to the contract and the resolution of a disputed contract outcome. Optionally, the POT platform 1308 also prepares and submits a transaction request 1334 to an external blockchain network, for example a cryptocurrency blockchain network. The transaction request 1334 to an external block chain network may include transaction information, the consensus contract outcome and one or more hashes generated by applying the hash function of the POT ledger to the transaction request 1330. By including hashes used in the blocks 1331 and/or 1330 stored on the POT ledger 1332, the blocks of two separate and distinct distributed ledgers on different blockchain networks can be identified is associated with one another.

Figure 10:
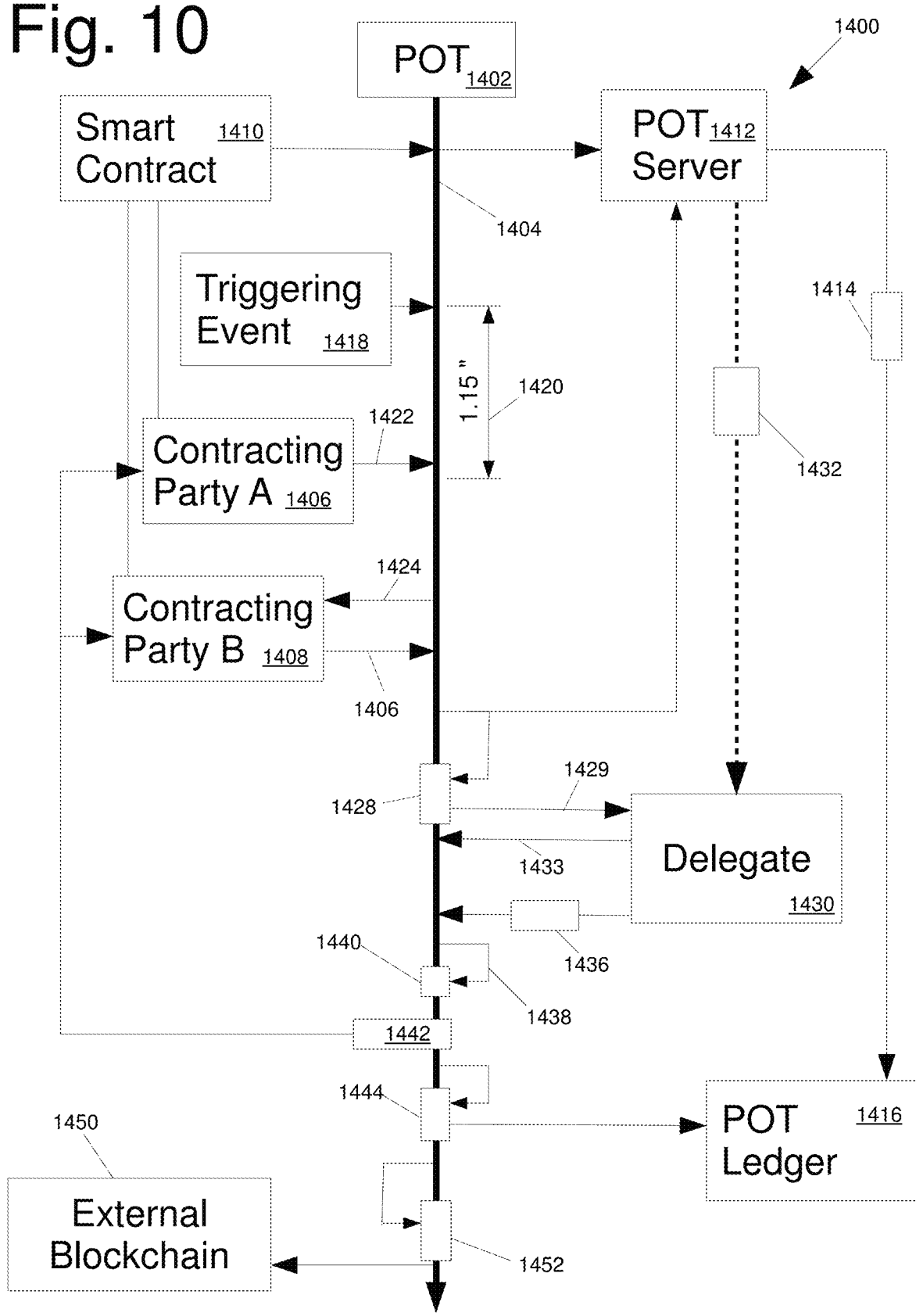
FIG. 10 is a diagram of an alternative embodiment of a method and system for storing data in accordance with principles of the invention.

FIG. 10 shows another embodiment of a system and method for storing data 1400 in accordance with the principles of the invention. The POT platform 1402 again is shown with a timeline 1404 extending downward. Contracting party A 1406 and contracting party B 1408 enter into a smart contract 1410 managed by the POT platform 1402. Confidential information from the smart contract 1410 is stored on a secure POT server 1412. The POT platform 1402 generates a block 1414 that is stored on the POT permissioned blockchain ledger 1416. The block 1414 includes nonconfidential information as well as one or more hashes generated from confidential information associated with the dispute resolution request. For example, one or both names of contracting party A 1406 and contracting party B 1408 may be used to generate hashes that are incorporated into the block 1414.

Performance on the smart contract 1410, such as payment from one party to another, on the contract 1410 is configured to be triggered by an external triggering event 1418 reported to or detected by the POT platform 1402. Once the triggering event 1418 occurs, the contracting parties 1406 and 1408 are given a limited amount of time 1420 in which to dispute the contract outcome. In FIG. 10, contracting party A 1406 disputes the contract outcome and has lodged a dispute resolution request 1422 with the POT platform 1402 within the allotted time 1420. As a result, the platform 1402 sends an invitation 1424 to the second contracting party 1408 to submit additional disputed contract data 1426 in response to the invitation 1424. Confidential information from the dispute resolution request 1422 and additional disputed contract data 1406 is stored on the server 1412.

Once the platform 1402 receives the additional disputed contract data 1426, it generates a dispute case summary 1428. The dispute case summary 1428 includes the assigned dispute category, nonconfidential disputed contract data, and deadline for submitting a dispute resolution decision. The case summary 1428 may also include incentives available to a delegate for rendering a decision on the disputed contract outcome. The case summary 1428 is appended to an invitation 1429 to a delegate in the assigned dispute category inviting the delegate to render a decision on the disputed contract outcome.

The platform 1402 sends invitations 1429 to delegates in the correct category, including a case summary. Each delegate sends a response 1433 either accepting or declining the invitation. The total number of delegates required varies depending on the configuration of the platform 1402 as well as selections by one or both contracting parties 1406 and 1408. Once the predetermined number of delegates 1430 have accepted the invitations, the platform 1402 ceases sending any further invitations.

When a delegate 1430 accepts an invitation 1433, he or she is provided access to confidential disputed contract data 1432 from the server 1412. Each delegate 1430 sends the platform 1402 a disputed resolution decision 1436, which may include an explanation of the decision. Once the platform 1402 has received all of the disputed contract decisions 1436 from each of the appropriate delegates 1430, the platform 1402 applies a consensus algorithm 1438 to the disputed contract decisions to provide a consensus contract outcome 1440. The consensus dispute outcome 1440 is incorporated into a consensus dispute resolution record 1442 which is forwarded to the contracting parties 1406 and 1408. The consensus dispute outcome 1440 optionally includes the individual decisions from each of the appropriate delegates 1430, and also optionally includes all or a portion of the explanations provided by the delegates 1430. In addition, the platform 1402 stores information relating to the smart contract, the disputed contract outcome, the consensus dispute outcome and optionally the explanations provided by the delegates for their respective disputed contract decisions by generating a block 1444 which is added to the ledger 1416 of the POT permissioned blockchain network. The block 1444 includes the consensus contract outcome 1440, non-confidential disputed contract data, and hashes based on some of the confidential contract dispute data. The block 1444 also preferably includes hashes generated from the previous block 1414.

Optionally, the platform 1402 may also store data on a ledger on an external blockchain network 1450 by generating a transaction request 1452 that includes information relating to the smart contract, the consensus dispute outcome, and one or more hashes generated from the confidential information within the disputed contract outcome data. The hashes added to the block 1452 may be the same as or different from the hashes used in blocks 1414 and 1444.

FIG. 11 shows an alternative embodiment of a system and method for storing data 1500 where the proof of trust platform 1502 interacts synergistically with an external network 1504. The external network 1504 may be a network specialized to concentrate on a particular industry or a particular type of consumer. As an illustrative example, the external network 1504 may be a website platform titled "handyguy.com" where a homeowner can search for, find and enter into a smart contract with another person or company to perform home maintenance or improvement. For example, contracting party A 1506 is a homeowner who finds contracting party B 1508 on the external network 1504 and hires contracting party B to paint contracting party A's house. The contracting parties agree on a price and enter into a smart contract 1510 which is stored and managed by the external network 1504. Contracting party A 1506 instructs contracting party B 1508 to paint the house white, and this color choices included in the smart contract 1510.

Contracting party B 1508 paints the house and when completed sends a triggering event 1512 to the external network 1504. This begins a predetermined time period 1514 within which contracting party A 1506 may dispute whether the contract 1510 has been fully performed. In this case, contracting party A 1506 believes that the house has been painted gray, not white. Contracting party A 1506 therefore files a dispute resolution request 1518. The dispute resolution request 1518 includes the disputed contract outcome, the original smart contract 1510 and disputed contract data. In this case, the disputed contract data includes photographs of the house showing the color has been painted. The disputed contract data may also include emails or text messages between the parties relating to the paint color. For example, contracting party A 1506 may include an email in which he or she clearly states that the paint color must be a pure white not an off-white.

The dispute resolution request 1518 is submitted to the handyguy.com network 1504 and is forwarded through network 1504 to the POT platform 1502. Communications between the POT platform 1502 and the contracting parties in this embodiment are accomplished by flowing through the external network 1504. This allows the POT platform 1502 to operate independently and distinctly from the external network 1504 while also preventing the confusion that may result by requiring the contracting parties to interact with a different website platform during the dispute resolution process.

Upon receiving the dispute resolution request 1518, the POT platform 1502 sends an invitation 1519 to contracting party B 1508 inviting it to submit a response, including providing additional disputed contract outcome data 1520. The additional disputed contract data 1520 may include other information. For example, contracting party B 1508 may include a text message from contracting party B 1508 two contracting party a 1506 stating that a pure white color was unavailable and in less contracting party a expressly objected in writing, party B 1508 would select an off-white color instead of pure white.

The POT platform 1502 stores information from the dispute resolution request 1518 and the additional data 1520 on a secure server 1522. The platform 1502 also generates a block 1524 that includes nonconfidential information and one or more hashes generated from confidential information and adds this block 1524 to the POT distributed ledger 1526 located on a permissioned blockchain network. The platform 1502 assigns a dispute reason code to the dispute resolution request 1518 and sends an invitation 1528 to an appropriate delegate 1530 with in a POT delegate network. The invitation 1528 includes the dispute reason code and a case summary providing general, nonconfidential information regarding the nature of the dispute and a deadline by with a decision must be rendered by the appropriate delegate 1530. The appropriate delegate sends an acceptance 1532 of the invitation, after which the appropriate delegate 1530 is provided all of the disputed contract data on the server 1522. Additional invitations are sent out until a predetermined number of appropriate delegates 1530 have accepted the invitations 1528. The smart contract 1510, the dispute resolution request 1518 and all of the disputed contract data is either sent directly to the appropriate delegate 1530, or is otherwise made available to the delegate 1530 via the POT secure server 1522.

The appropriate delegate 1530 submits a dispute outcome decision 1534 which preferably also includes an explanation and basis for the decision. The platform 1502 performs a consensus algorithm 1536 on all of the collected dispute resolution decisions 1534 from all of the appropriate delegates 1530. The consensus algorithm 1536 generates a consensus dispute outcome 1540. The consensus dispute outcome 1540 is incorporated into a dispute resolution record 1542 that includes the consensus contract outcome 1540 and may also include the individual dispute outcome decisions 1534 and optionally explanations of how the outcome decisions were reached by the appropriate delegates. The consensus contract outcome data packet 1542 is transmitted to the contracting parties 1506 and 1508 through the external network 1504. Finally, the platform 1502 creates a block 1546 which it adds to the POT distributed ledger 1526. The block 1546 includes nonconfidential information relating to the contract and the consensus contract outcome. The block 1546 also includes one or more hashes created by applying hash functions to portions of the confidential information related to the consensus contract outcome 1540. The block 1546 may also include hashes generated from information from block 1524 previously submitted to the POT ledger 1526. Block 1524 may also be transmitted to the external network 1504 where it may be used directly as a transaction request 1550 submitted to an external block chain 1555. Optionally, the external network 1504 may modify block 1524 to customize it for another external block chain ledger 1555. For example, the external blockchain ledger 1555 may be a cryptocurrency such as Bitcoin®. The smart contract 1510 may include information such as instructions on how to configure a transaction request for a particular cryptocurrency blockchain to affect payment under the smart contracts. The POT platform 1502 includes this information and properly configures block 1546 such that it may be applied to both the POT ledger 1526 and the external block chain ledger 1555. Optionally, block 1546 may be configured to require only a minimal amounts of modification prior to submission is a transaction request to the external ledger 1555. In any of these described circumstances, the same hashes derived by applying the same hash functions to the same confidential information relating to the smart contract 1510 may be included in blocks on both the POT block chain ledger 1526 and the external blockchain ledger 1555.

Whereas, the present invention has been described in relation to the drawings attached hereto, other and further modifications, apart from those shown or suggested herein, may be made within the spirit and scope of this invention. Those skilled in the art will appreciate that the conception, upon which this disclosure is based, may readily be utilized as a basis for the designing of other structures, methods and systems for carrying out the several purposes of the present invention. Descriptions of the embodiments shown in the drawings should not be construed as limiting or defining the ordinary and plain meanings of the terms of the claims unless such is explicitly indicated. The claims should be regarded as including such equivalent constructions insofar as they do not depart from the spirit and scope of the present invention.

The invention claimed is:

1. A method for storing data comprising:
receiving, by one or more computer devices, a dispute resolution request from a first contracting party;
sending, by the one or more computing devices, to a second contracting party the dispute resolution request and an invitation to provide a response to the dispute resolution request;
receiving, by the one or more computing devices, the response to the dispute resolution request from the second contracting party;
generating, by the one or more computing devices, a dispute case summary based on the dispute resolution request and the response to the dispute resolution request;
forwarding, by the one or more computing devices, the dispute case summary to three or more delegates within a dispute resolution network;
receiving, by the one or more computing devices, dispute resolution decisions from the three or more delegates;
determining, by the one or more computing devices, a consensus contract outcome based on a threshold number of the dispute resolution decisions received from the three or more delegates of the dispute resolution network being in agreement with each other;
defining a baseline rating for each of the three or more delegates individually, where the rating is modified based upon whether the delegate was correct or incorrect when compared to the consensus contract outcome, by adding a point to their baseline rating when the delegate was correct, or by subtracting a point when the delegate was incorrect; wherein an award to each delegate may be established or adjusted based upon $\Sigma_r - 2i = i^1, i^2, i^3, i^4, i^5$, where i is a amount of times the delegate was incorrect when compared to the consensus contract outcome and r is a baseline rating assigned to the delegate;
storing, by the one or more computing devices, a dispute resolution record on a block of a permissioned blockchain network; wherein the dispute resolution record includes the consensus contract outcome, and the block of the permissioned blockchain network on which the dispute resolution record is stored includes a hash generated by the permissioned blockchain;
forwarding, by the one or more computing devices, a transaction request to an external cryptocurrency blockchain network, separate from the permissioned blockchain network, based on the consensus contract outcome; and,
forwarding, by the one or more computing devices, the dispute resolution record to the first contracting party and the second contracting party;
wherein the transaction request to an external cryptocurrency blockchain includes the hash generated by the permissioned blockchain for the block on which the dispute resolution record is stored on the permissioned blockchain network.

2. The method of storing data of claim 1 wherein the dispute resolution record further comprises the dispute resolution decisions received from the delegates.

3. The method of storing data of claim 2 wherein the dispute resolution decisions from the three or more delegates include explanations of the dispute resolution decisions and the rating for each of the three or more delegates; and,
wherein the disputed contract is a smart contract managed by an external network and the dispute resolution request is sent to the one or more computing devices through the external network.

4. The method of storing data of claim 3 wherein the disputed contract is a smart contract managed by the one or more computing devices.

5. The method of storing data of claim 4 further comprising sending, by the one or more computing devices, a notification to the first and second contracting parties of the occurrence of a triggering event of the smart contract and of a deadline within which to file the dispute resolution request.

6. The method of storing data of claim 1 wherein the one or more computing devices is a node of the cryptocurrency blockchain network.

7. The method of storing data of claim 6 further comprising sending, by the one or more computing devices, a notification to the first and second contracting parties of the occurrence of a triggering event of the smart contract and of a deadline within which to file the dispute resolution request.

8. A system for storing data, comprising a processor and a non-transitory computer readable storage medium storing instructions executable by the processor to cause the system to perform operations comprising:
receiving, by one or more computer devices, a dispute resolution request from a first contracting party;

sending, by the one or more computing devices, to a second contracting party the dispute resolution request and an invitation to provide a response to the dispute resolution request;

receiving, by the one or more computing devices, the response to the dispute resolution request from the second contracting party;

generating, by the one or more computing devices, a dispute case summary based on the dispute resolution request and the response to the dispute resolution request;

forwarding, by the one or more computing devices, the dispute case summary to three or more delegates within a dispute resolution network;

receiving, by the one or more computing devices, dispute resolution decisions from the three or more delegates;

determining, by the one or more computing devices, a consensus contract outcome by applying based on a threshold number of the dispute resolution decisions received from the three or more delegates of the dispute resolution network being in agreement with each other;

defining a baseline rating for each of the three or more delegates individually, where the rating is modified based upon whether the delegate was correct or incorrect when compared to the consensus contract outcome, by adding a point to their baseline rating when the delegate was correct, or by subtracting a point when the delegate was incorrect; wherein the an award to each delegate may be established or adjusted based upon $\Sigma_r - 2i = i^1, i^2, i^3, i^4, i^5$, where i is the amount of times the delegate was incorrect when compared to the consensus contract outcome and r is the baseline rating assigned to the delegate;

storing, by the one or more computing devices, a dispute resolution record on a block of a permissioned blockchain network; wherein the dispute resolution record includes the consensus contract outcome, and the block of the permissioned blockchain network on which the dispute resolution record is stored includes a hash generated by the permissioned blockchain;

forwarding, by the one or more computing devices, a transaction request to an external cryptocurrency blockchain network, separate from the permissioned blockchain network, based on the consensus contract outcome; and, forwarding, by the one or more computing devices, the dispute resolution record to the first contracting party and the second contracting party;

wherein the transaction request to an external cryptocurrency blockchain includes the hash generated by the permissioned blockchain for the block on which the dispute resolution record is stored on the permissioned blockchain network.

9. The system for storing data of claim 8 wherein the dispute resolution record further comprises the dispute resolution decisions received from the delegates.

10. The system for storing data of claim 9 wherein the dispute resolution decisions from the three or more delegates include explanations of the dispute resolution decisions and the ratings for each of the three or more delegates.

11. The system for storing data of claim 10 further comprising sending a notification to the first and second contracting parties of the occurrence of a triggering event of the smart contract and of a deadline within which to file the dispute resolution request.

12. The system for storing data of claim 8 wherein the processor is a node of the cryptocurrency blockchain network.

13. The system for storing data of claim 12 wherein the dispute resolution request comprises a contract, a disputed contract outcome and disputed contract data; and, wherein the response to the dispute resolution request comprises additional disputed contract data.

14. The system of claim 13 wherein the disputed contract is a smart contract managed by an external network and the dispute resolution request is sent to the processor through the external network.

15. The system of storing data of claim 14 further comprising sending a notification to the first and second contracting parties of the occurrence of a triggering event of the smart contract and of a deadline within which to file the dispute resolution request.

* * * * *